United States Patent
Andermo

(12) 
(10) Patent No.: US 6,892,590 B1
(45) Date of Patent: May 17, 2005

(54) SINGLE-BALANCED SHIELD ELECTRODE CONFIGURATION FOR USE IN CAPACITIVE DISPLACEMENT SENSING SYSTEMS AND METHODS

(75) Inventor: Nils Ingvar Andermo, Kirkland, WA (US)

(73) Assignee: AnderMotion Technologies LLC, Kirkland, WA (US)

( * ) Notice: Subject to any disclaimer, the term of this patent is extended or adjusted under 35 U.S.C. 154(b) by 0 days.

(21) Appl. No.: 10/701,772

(22) Filed: Nov. 4, 2003

(51) Int. Cl.[7] .............................. G01L 1/20; G01L 3/02
(52) U.S. Cl. .............................. 73/862.626; 73/862.337
(58) Field of Search .................... 73/862.337, 862.626, 73/862.52

(56) References Cited

U.S. PATENT DOCUMENTS

| | | | |
|---|---|---|---|
| 3,517,282 A | | 6/1970 | Miller |
| 3,668,672 A | | 6/1972 | Parnell |
| 3,702,957 A | | 11/1972 | Wolfendale |
| 3,732,553 A | | 5/1973 | Hardway |
| 3,784,897 A | | 1/1974 | Norrie |
| 4,449,179 A | | 5/1984 | Meyer |
| 4,843,387 A | * | 6/1989 | Arai et al. ............. 340/870.37 |
| 4,879,508 A | | 11/1989 | Andermo |
| 5,537,109 A | * | 7/1996 | Dowd .................... 340/870.37 |
| 6,483,321 B2 | * | 11/2002 | Brasseur ................ 340/870.37 |
| 6,492,911 B1 | | 12/2002 | Netzer |

* cited by examiner

*Primary Examiner*—Edward Lefkowitz
*Assistant Examiner*—Lilybett Martir
(74) *Attorney, Agent, or Firm*—Christensen O'Connor Johnson Kindness PLLC

(57) ABSTRACT

A capacitive encoder includes a signal-balanced shield electrode configuration that does not require electrical ground connection or active sensing and control in order to maintain the shield electrode(s) at a sufficiently constant voltage during capacitive position measurements. The shield electrode configuration is positioned in a capacitive coupling gap between transmitter electrodes and receiver electrodes during operation. The shield electrode configuration is patterned in a manner that complements the layout of the transmitter electrodes, such that the shield electrode configuration inherently floats at a nominally constant electrical potential when coupled to the signals present on the transmitter electrodes. The resulting capacitive encoder is thus more economical to build, convenient to install, and reliable during operation than capacitive encoders which use an electrical connection, compensation drive circuitry, or grounding in order to control the potential of a shield member that operates at a potential that is not inherently constant.

19 Claims, 20 Drawing Sheets

SINGLE-BALANCED SHIELD ELECTRODE CONFIGURATION FOR USE IN CAPACITIVE DISPLACEMENT SENSING SYSTEMS AND METHODS

FIELD OF THE INVENTION

This invention relates generally to displacement sensing capacitive encoders, and more particularly to capacitive encoders including a scale having signal-balanced shield electrode configuration that does not require an electrical connection or grounding of the shield electrode, in order to provide low cost, reliable, and high accuracy displacement sensing.

BACKGROUND OF THE INVENTION

Numerous capacitance-type measuring devices for making linear and angular displacement or position measurements have been developed wherein two members that are fixed relative to each other include respective capacitive electrodes that are capacitively coupled between the two support members and a third member is relatively movable between the two members to alter their capacitive coupling. The third member alters their capacitive coupling in a manner corresponding to the position of the third member relative to the first two members. The capacitive coupling affects one or more signals used to determine the position of the third member relative to the first two members. In a number of such measuring devices, the capacitive coupling, that is, the capacitance, is sensed by applying a plurality of temporally phase-shifted periodic signals to a plurality of capacitive transmitter electrodes on one of the first two members and measuring the relative phase shift of the one or more "summed" signals present on one or more capacitive receiver electrodes on the other one of the first two members, the relative phase shift of the one or miore "summed" signals resulting from the effect of the third member on the capacitive coupling between the electrodes first two members. Such capacitance-type measuring devices have a broad range of applications including motion control systems, measuring devices, and the like.

In a number of such capacitance-type measuring devices the third member includes one or more conductive electrodes that are effectively grounded to act as a "shield electrode" which affects or blocks the capacitive coupling between the first two members. For example, in U.S. Pat. No. 3,517,282, to Miller; U.S. Pat. No. 3,702,957, to Wolfendale; U.S. Pat. No. 3,732,553, to Hardway; U.S. Pat. No. 3,784,897, to Norrie; and U.S. Pat. No. 5,537,109, to Dowd, each of which is incorporated herein by reference for all of its relevant teachings, the third member includes one or more shield electrodes that are grounded to circuit or earth ground by electrical connection through a wire and/or wiper. Alternatively, U.S. Pat. No. 4,449,179, to Meyer, which is incorporated herein by reference for all of its relevant teachings, discloses grounding a "belt" shield electrode to earth ground (called "mass potential") by electrical connection, or by suitable capacitive coupling to an earth ground member.

In a further alternative, U.S. Pat. No. 3,668,672, to Parnell, which is incorporated herein by reference for all of its relevant teachings, discloses connecting a shield electrode to a receiver electrode through an amplifier in such a way that the shield electrode is maintained at the same signal level as the receiving electrode. U.S. Pat. No. 6,492,911, to Netzer, incorporated herein by reference in its entirety, provides an overview that further discusses numerous configurations for such capacitance-type measuring devices and their disadvantages, including some of the configurations included in the foregoing incorporated references. The '911 patent further discloses and claims a configuration that capacitively senses a signal on an electrode on the third member and, after amplification, feeds back a capacitively coupled signal of the opposite polarity to the shield electrode in order to actively control its voltage or potential.

SUMMARY OF THE INVENTION

It should be appreciated that the electrical connections and or capacitive coupling provided by the embodiments indicated above may be inconvenient, unreliable, or "insufficient" to effectively and fully ground the shield electrode in a variety of desirable capacitance-type measuring device configurations and applications. Furthermore, the amplifier circuitry indicated above that feeds back a capacitively coupled signal of the opposite polarity to the shield electrode in order to actively control its voltage or potential introduces additional complexity and cost and may also be inconvenient, unreliable, or "insufficient" to effectively and fully control the voltage or potential of the shield electrode in a variety of desirable capacitance-type measuring device configurations and applications. Thus, a capacitance-type measuring device that can overcome the foregoing problems and disadvantages, individually or in combination, is desirable.

The present invention is directed to providing a capacitive encoder that overcomes the foregoing and other disadvantages. The capacitive encoder includes two members that are fixed relative to each other and that include respective capacitive electrodes that are capacitively coupled between the two members. A third member includes a shield electrode that is relatively movable between the two members to alter their capacitive coupling in a manner corresponding to the position of the third member relative to the first two members. The capacitive coupling affects one or more signals used to determine the position of the third member relative to the first two members. In general, to provide a relatively simple device that provides reliable and accurate operation, it is desirable that the shield electrode has a constant or standard voltage, at least at the time of measuring the one or more signals used to determine the position. Furthermore, it is desirable to avoid reliance on inconvenient and/or unreliable electrical connections and/or complex active circuits in order to maintain the shield electrode at a constant or standard voltage. Thus, more specifically, the present invention is directed to a capacitive encoder including a signal-balanced shield electrode configuration that does not require electrical ground connection or active sensing and control of its shield electrode(s) voltage in order to maintain the shield electrode(s) at a sufficiently constant voltage or potential to achieve a desired level of accuracy during capacitive displacement or position measurements.

Alternatively, rather than replacing or eliminating the previously outlined electrical ground connection or active sensing and control of a shield electrode(s) voltage, the present invention can be used to maintain the shield electrode(s) at an approximately constant voltage or potential during capacitive displacement or position measurements in combination with such electrical ground connection or active sensing and control configurations and methods, in order to provide an additional measure of signal stability and reliability, and/or to relatively reduce the complexity and/or operational requirements of the electrical ground connection or active sensing and control elements. In either case, the present invention provides a number of desirable features, including relatively reduced cost, increased reliability, and high accuracy displacement sensing.

A capacitive encoder including a signal-balanced shield electrode configuration is disclosed. In accordance with one aspect of the invention, the signal-balanced shield electrode is patterned in a manner that complements the layout of the transmitter electrodes of the capacitive encoder, such that the signal-balanced shield electrode inherently or passively floats at a nominally constant electrical potential or voltage when coupled to the signals present on the transmitter electrodes. The resulting capacitive encoder is thus more economical to build, convenient to install, and reliable during operation than capacitive encoders which use an electrical connection, compensation drive circuitry, or grounding in order to control the voltage or potential of a shield member that operates at a voltage or potential that is not inherently constant.

In accordance with a further aspect of the invention, the signal-balanced shield electrode modulates the capacitive coupling between a plurality of capacitive encoder transmitter electrodes and at least one capacitive encoder receiver electrode(s), the modulation being a function of the displacement or position of the shield electrode along a measuring axis relative to the transmitter and receiver electrodes.

In accordance with a further aspect of the invention, at least one signal arising from a receiver electrode depends on the modulated capacitive coupling.

In accordance with a separate aspect of the invention, the signal-balancing shield electrode floats electrically.

In accordance with a further aspect of the invention, the signal-balancing shield electrode is configured and/or mounted in a manner that relatively reduces its capacitive coupling to an external member that is mechanically coupled to move the signal-balancing shield electrode.

In accordance with a separate aspect of the invention, at least two respective signals arising from at least two receiver electrodes are provided for input to a differential signal processing circuit, the least two respective signals depending on the modulated capacitive coupling.

In accordance with a separate aspect of the invention, at least two respective signals arising from at least two receiver electrodes provide quadrature signals.

In accordance with a separate aspect of the invention, the signal-balanced shield electrode modulates the capacitive coupling between a plurality of capacitive encoder transmitter electrodes and at least one capacitive encoder receiver electrode(s) such that the modulation includes an approximately sinusoidal component as a function of the displacement or position of the shield electrode along a measuring axis relative to the transmitter and receiver electrodes.

In accordance with a separate aspect of the invention, the signal-balanced shield electrode includes a configuration that is periodic along a measuring axis direction according to a shield electrode spatial wavelength or pitch.

In accordance with a further aspect of the invention, at least one respective receiver electrode has a dimension along the measuring axis direction that corresponds to an integer number of the shield electrode spatial wavelength or pitch.

In accordance with a further aspect of the invention, the signal-balanced shield electrode configuration that is periodic along a measuring axis direction includes at least one electrode boundary that meanders in a periodic fashion along the measuring axis direction.

In accordance with a further aspect of the invention, the at least one electrode boundary that meanders in a periodic fashion along the measuring axis direction creates an overlapping shield area for at least one receiver electrode, the overlapping shield area periodically spatially modulated along the measuring axis direction based on the periodic meander of the at least one boundary.

In accordance with a further aspect of the invention, a plurality of transmitter electrodes at least approximately span the width of the entire shield electrode along a direction perpendicular to the measuring axis direction, regardless of the periodic meander of the at least one boundary, such that the overlapping shield area for each of the plurality of transmitter electrodes is constant, regardless of the periodic meander and regardless of the relative position of the transmitter electrodes and the shield electrode along the measuring axis direction.

In accordance with a separate aspect of the invention, a plurality of respective transmitter electrodes are operable to provide a plurality of respective transmitter signals, and the plurality of respective transmitter electrodes form a group that is repeated along the measuring axis direction according to the shield electrode spatial wavelength or pitch.

In accordance with a separate aspect of the invention, the measuring axis direction follows a path that is one of straight, circular, and cylindrical.

In accordance with a separate aspect of the invention, the capacitive encoder includes at least two respective signal-balanced shield electrodes patterned in a manner that complements the layout of respective transmitter electrodes of the capacitive encoder, such that each signal-balanced shield electrode inherently or passively floats at a nominally constant electrical potential or voltage when coupled to the signals present on the transmitter electrodes and each respective signal-balanced shield electrode includes a configuration that is periodic along a measuring axis direction according to a unique respective shield electrode spatial wavelength or pitch such that the capacitive encoder is usable to determine an absolute position over at least a first range of positions based on at least two respective signals modulated according to at least two unique respective shield electrode spatial wavelengths or pitches.

In various exemplary embodiments, at least one pair of transmitter electrodes provides at least one pair of changing input voltage signals having equal and opposite magnitudes. In various exemplary embodiments, each such signal pair is a pair of sinusoidal AC voltages having 180 degrees temporal phase difference. In various exemplary embodiments, the signal-balanced shield electrode is configured such that it overlaps each electrode of such electrode pairs so as to provide the same net capacitive coupling area to each electrode, regardless of the relative position of the shield electrode and the pair of electrodes along the measuring axis direction. Thus, in such embodiments, the shield electrode is always equally capacitively coupled to input voltage signals having equal and opposite magnitudes, and accordingly it inherently or passively floats at a nominally constant DC voltage determined by the transmitter signals. The DC voltage determined by the transmitter signals may be "zero volts" electrical potential or a DC voltage that is the same as the circuit ground potential in various exemplary embodiments. Thus, the shield electrode is effectively maintained at a constant DC potential, without the use of a ground connection (although, as previously discussed, a redundant active or passive ground connection is also within the scope of this invention.)

Hence, the invention overcomes the disadvantages of prior art capacitive displacement sensing devices that use electrically connected, externally coupled, or actively controlled shield electrodes, in order to provide either rotary or linear measurements with sensing systems that are more convenient, economical, reliable and compact

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
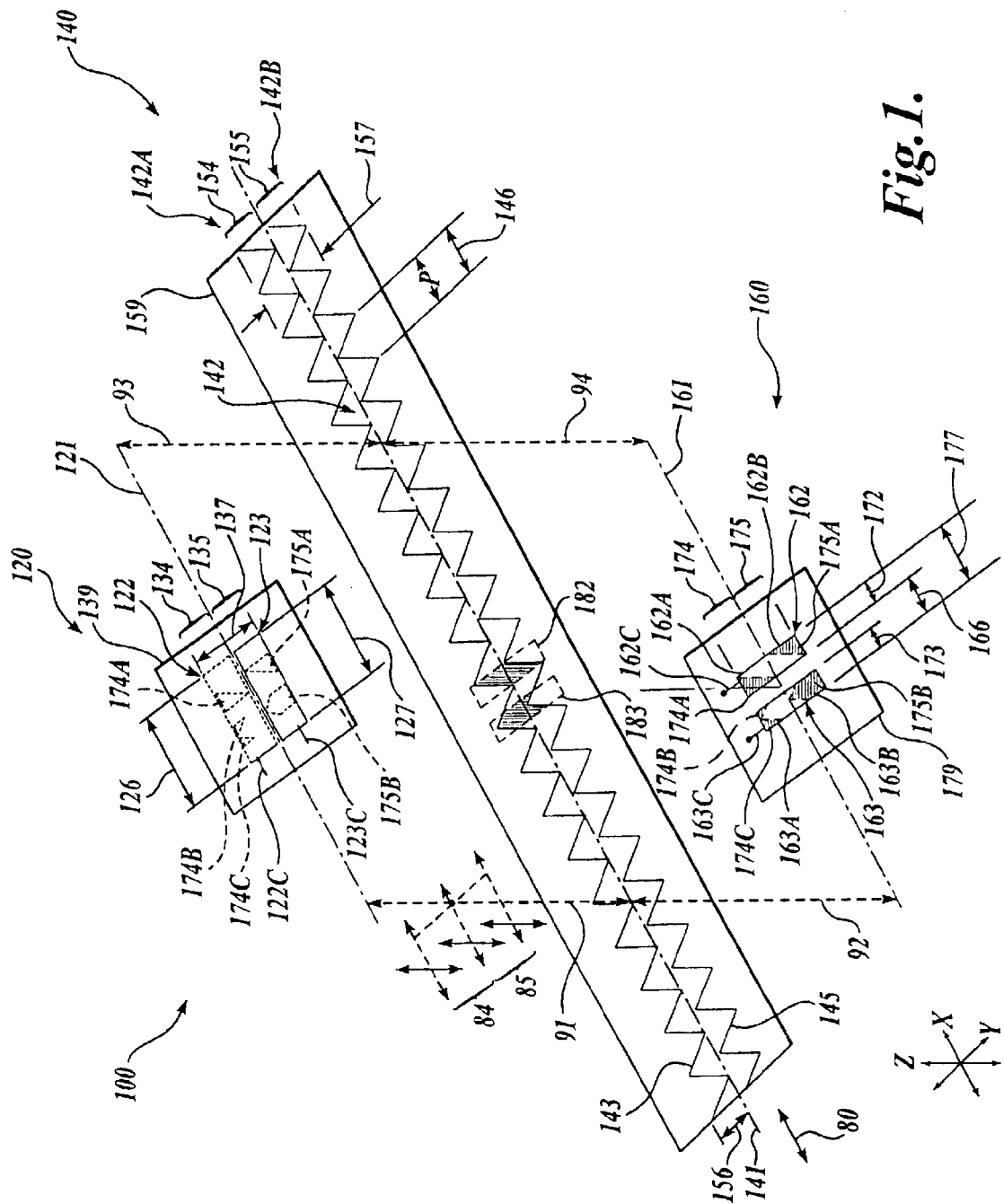
FIG. 1 is an exploded isometric view of a first exemplary embodiment of a signal-balanced electrode configuration according to this invention that is usable in a capacitive encoder according to this invention.

FIG. 1 shows a generic first exemplary embodiment of a signal-balanced electrode configuration 100 according to this invention that is usable in a capacitive encoder according to this invention. As shown in FIG. 1, the first exemplary embodiment of a signal-balanced electrode configuration 100 includes a transmitter electrode configuration 120 carried on a transmitter electrode member 139, a shield electrode configuration 140 carried on a shield electrode member 159, and a receiver electrode configuration 160 carried on a receiver electrode member 179. The shield electrode member 159 acts as the scale for displacement measurement, and various shield electrode configurations, shield electrode members and/or shield electrodes may also be referred to as scales herein. In various embodiments, the shield electrode configuration 140 should be understood to comprise a segment of an arbitrarily longer shield electrode configuration 140.

Also shown in FIG. 1 are a measuring axis/direction 80 and an X-Y-Z orthogonal coordinate axes, for convenience of description. In general, in the following discussions, the X-axis is aligned with the measuring axis/direction 80, the Z-axis is perpendicular to the measuring axis/direction 80 and generally normal to the surfaces of the various electrodes described herein, and the Y-axis is perpendicular to the measuring axis/direction 80 and to the direction normal to the surfaces of the various electrodes described herein. At various locations along the measuring axis/direction 80, the Y-axis is generally parallel to the surfaces of the various electrodes described herein. For convenience of description, it is useful to define respective alignment/centerlines 121, 141 and 161 for the transmitter electrode configuration 120, the shield electrode configuration 140 and the receiver electrode configuration 160, respectively, as described in greater detail below. For convenience of description, it is also useful to define respective first and second capacitive coupling zones 84 and 85 extending along the measuring axis/direction 80 and having respective widths extending along the Y-axis on opposite sides of the alignment/ centerlines 121, 141 and 161 as shown in FIG. 1.

In the exemplary embodiment shown in FIG. 1, the shield electrode configuration 140 includes a shield electrode 142 that meanders to form a periodic pattern extending along the measuring axis/direction 80. The periodic pattern has a wavelength or pitch P, which is also indicated by the dimension 146 in FIG. 1, along the measuring axis/direction 80. The shield electrode 142 has a first shield electrode border 143 and a second shield electrode border 145 that are separated along the Y-axis direction by a constant effective shield electrode width 156. The shield electrode 142 also has a shield electrode span width 157 along the Y-axis direction that encompasses the extents of the shield electrode and is conveniently made constant along the measuring axis/ direction 80 as shown in FIG. 1. For convenience of description, it is useful to define respective first and second shield electrode portions 142A and 142B that extend along the measuring axis/direction 80 and define first and second shield electrode coupling tracks 154 and 155, which fall within the first and second capacitive coupling zones 84 and 85, respectively. In the exemplary embodiment shown in FIG. 1, first and second shield electrode portions 142A and 142B conveniently have approximately equal areas and approximately equal respective portion span widths, which are each one half of the shield electrode span width 157, along the Y-axis direction in the respective first and second shield electrode coupling tracks 154 and 155.

In the exemplary embodiment shown in FIG. 1, the transmitter electrode configuration 120 includes a first transmitter electrode 122 having first transmitter electrode connection 122C and a second transmitter electrode 123 having second transmitter electrode connection 123C. The first and second transmitter electrodes 122 and 123 are separated by an insulating gap along the Y-axis direction.

The first and second transmitter electrodes 122 and 123 have respective lengths 126 and 127 that are equal to each other and equal to 2P in the exemplary embodiment shown in FIG. 1. In general, the lengths of the transmitter electrodes are also made equal to or greater than a receiver electrode group length 177 of the receiver electrode configuration 160 along the measuring axis/direction 80, as described further below. More generally, in various exemplary embodiments, the lengths of the transmitter electrodes are equal to each other and to an integer number times the wavelength P. It should be appreciated that when the lengths of the transmitter electrodes are made equal to each other and to an integer number times the wavelength P, and when there is an approximately constant operating gap along the Z-axis direction between transmitter electrode configuration 120 and the shield electrode configuration 140, the previously described meandering shield electrode 142 will capacitively couple approximately equally to the first and second transmitter electrodes 122 and 123, regardless of its relative position along the measuring axis/direction 80, providing one aspect of a signal-balanced electrode configuration according to the principles of this invention.

For convenience of description, it is useful to define a first transmitter electrode coupling track 134 and a second transmitter electrode coupling track 135, which fall within the first and second capacitive coupling zones 84 and 85, respectively. In the exemplary embodiment shown in FIG. 1, the first transmitter electrode 122 and the second transmitter electrode 123 conveniently have approximately equal areas and approximately equal span widths along the Y-axis direction in the respective first and second transmitter electrode coupling tracks 134 and 135.

In the exemplary embodiment shown in FIG. 1, the first and second transmitter electrodes 122 and 123 also have equal areas outside the first and second transmitter electrode coupling tracks 134 and 135, which tends to help balance various common mode errors that may arise in the measurement signals provided using the signal-balanced electrode configuration 100. However, in various other embodiments, provided that the shield electrode 142 will capacitively couple approximately equally to the first and second transmitter electrodes 122 and 123, regardless of its relative position along the measuring axis/direction 80, it is not strictly necessary that the first and second transmitter electrodes 122 and 123 also have equal areas.

In general, a combined-transmitter electrode span width 137 is advantageously made approximately the equal to the shield electrode span width 157, which tends to provide a compact transducer while also providing a maximum measurement signal amplitude for the embodiment shown in FIG. 1. In practice, it is also advantageous in various exemplary embodiments to provide a combined transmitter electrode span width 137 that is slightly greater than the shield electrode span width 157 and less than the width of the receiver electrodes 162 and 163 along the Y-axis, such that minor variations in the alignment of the various electrode members does not alter the overlapping capacitive coupling area between either of the first or second transmitter electrodes 122 or 123 and the various other transducer electrodes, in order to reduce potential signal error contributions due to the minor misalignments.

As shown in FIG. 1, the receiver electrode configuration 160 includes a first receiver electrode 162 having a first receiver electrode connection 162C and a second receiver electrode 163 having a second receiver electrode connection 163C. For convenience of description, it is useful to define a respective first portion 162A and second portion 162B of the receiver electrode 162 and a respective first portion 163A and second portion 163B of the receiver electrode 163.

For convenience of description, it is useful to define first and second receiver electrode coupling tracks 174 and 175 which, fall within the first and second capacitive coupling zones 84 and 85, respectively. In the exemplary embodiment shown in FIG. 1, the first portion 162A and second portion 162B conveniently have approximately equal areas and approximately equal respective span widths along the Y-axis direction in the respective first and second receiver electrode coupling tracks 174 and 175. Similarly, the first portion 163A and second portion 163B conveniently have approximately equal areas and approximately equal span widths along the Y-axis direction in the respective first and second receiver electrode coupling tracks 174 and 175. In various exemplary embodiments, the first and second receiver electrodes 162 and 163 each have a width along the Y-axis that exceeds the shield electrode span width 157, in order to encompass the extents of the shield electrode along the Y-axis when the receiver electrode configuration 160 and shield electrode configuration 140 are operably aligned.

The first portions 162A and 163A and the second portions 162B and 163B of the first and second receiver electrodes 162 and 163 all have equal lengths 172 and 173 along the measuring axis/direction 80 (the X-axis direction). In the exemplary embodiment shown in FIG. 1, the lengths 172 and 173 are approximately one half of the wavelength P. The first and second receiver electrodes 162 and 163 are also offset from each other along the measuring axis/direction 80 by the offset dimension 166, which is three-quarters of the wavelength P in the exemplary embodiment shown in FIG. 1, which leads to the production of quadrature signals on the first and second receiver electrodes 162 and 163, as described further below. A receiver electrode group length 177 along the X-axis direction is defined by the combined extents of the receiver electrodes 162 and 163 along the X-axis direction.

In operation, the transmitter electrode member 139, the shield electrode member 159, and the receiver electrode member 179 are arranged such that the alignment/centerlines 121, 141 and 161 are generally aligned as indicated by the dashed arrows 91–94 in FIG. 1, and the transmitter electrode configuration 120 and the receiver electrode configuration 160 are positioned along the measuring axis/direction 80 such that they are centered relative to each other (or as otherwise appropriate according to their mutual design in various specific embodiments.) The transmitter electrode member 139 and the receiver electrode member 179 are arranged in a fixed relationship with an operable and uniform capacitive gap between them along the Z-axis, the capacitive gap being somewhat greater than the thickness of the shield electrode member 159 along the Z-axis such that the shield electrode member 159 may be moved along the measuring axis/direction 80 in the capacitive gap.

It should be appreciated that during operation, in order for the shield electrode 142 to capacitively couple approximately equally to the first and second transmitter electrodes 122 and 123 regardless of its relative position along the measuring axis/direction 80 according to one aspect of this invention, and to provide the best practical accuracy, the shield electrode member 159 should be guided along the measuring axis/direction 80 such that the shield electrode 142 is maintained with the most uniform gap and alignment that is practical and/or economical relative to the transmitter electrodes 122 and 123.

It should be appreciated that when the operable capacitive gap between the transmitter electrode member 139 and the receiver electrode member 179 is relatively larger, the measurement signals provided using the signal-balanced electrode configuration 100 will exhibit relatively reduced errors due to minor variation in the alignment and guiding of the shield electrode member 159 in that gap. However, the magnitude of the measurement signals will also be relatively reduced at larger gaps. Conversely, when the operable capacitive gap is relatively smaller, the measurement signals provided using the signal-balanced electrode configuration 100 will exhibit relatively larger errors due to minor variation in the alignment and guiding of the shield electrode member 159 in that gap. However, the magnitude of the measurement signals will also be relatively increased at smaller gaps. The operable gap that establishes the best tradeoff between these effects can be established by analysis and/or confirmed experiment for any particular transducer including a signal-balanced electrode configuration according to this invention.

As previously mentioned, when there is an approximately uniform operating gap along the Z-axis direction between the transmitter electrode configuration 120 and the shield electrode configuration 140, the previously described shield electrode configuration 140 will capacitively couple approximately equally to the first and second transmitter electrodes 122 and 123, regardless of their relative position along the measuring axis/direction 80, providing one aspect a signal-balanced electrode configuration according to the principles of this invention. Thus, in operation, when respective changing voltage signals of equal amplitude and opposite polarity are connected through the first and second transmitter electrodes connections 122C and 123C and provided on the first and second transmitter electrodes 122 and 123, their respective contributions to the response voltage arising on the shield electrode will likewise be of equal amplitude and opposite polarity. Accordingly, the signals thus balance each other to provide no net change in the voltage of the electrically floating shield electrode 142, according to the principles of this invention. In various exemplary embodiments, the shield electrode 142 will thus be maintained at a DC voltage determined by the transmitter signals, which may be zero volts in various exemplary embodiments.

It should be appreciated that according to the principles and configurations disclosed herein, when a shield electrode maintains no net change in its voltage, at least at each time that the transducer provides a displacement measurement signal, then the shield electrode itself will not contribute to any erroneous voltage-related signal variations on the receiver electrodes. Accordingly, it will act as desired, that is, simply as a displacement-dependent screening or blocking element between the transmitter and receiver electrodes.

Regarding another aspect of operation of the signal-balanced electrode configuration 100, when there is an approximately uniform operating gap along the Z-axis direction between the previously described transmitter electrode configuration 120 and receiver electrode configuration 160, in the hypothetical absence of the shield electrode 142 each of the first and second transmitter electrodes 122 and 123 will capacitively couple approximately equally to the first and second receiver electrodes 162 and 163. Thus, when respective voltage signals of equal and opposite polarity are provided on the first and second transmitter electrodes 122 and 123, their respective contributions to the voltage arising on either of the respective first and second transmitter electrodes 162 and 163 will likewise be of equal and opposite polarity, thus balancing each other to provide no net change in the respective signals provided by the respective first and second receiver electrodes 162 and 163. In various exemplary embodiments, the signals from the first and second receiver electrodes 162 and 163 would thus be constant at a DC voltage determined by the transmitter signals, which may be zero volts in various exemplary embodiments, in the hypothetical absence of the shield electrode 142. This tends to reduce or eliminate certain signal errors that may otherwise arise in the measurement signals provided using various signal-balanced electrode configurations according to this invention.

Regarding another aspect of operation of the signal-balanced electrode configuration 100, as shown in FIG. 1 the respective dashed phantom outlines 182 and 183 represent the projection of the areas of first and second receiver electrodes 162 and 163, respectively, onto the shield electrode element 159. The shaded portions of the dashed phantom outlines 182 and 183 represent the areas where the shield electrode 142 effectively screens or blocks the first and second receiver electrodes 162 and 163 from capacitively coupling to the first and second transmitter electrode elements 122 and 123.

Accordingly, the dashed phantom outlines 174A–174C represent the remaining areas where the first transmitter electrode 122 capacitively couples to the first and second receiver electrodes 162 and 163, and the dashed phantom outlines 175A and 175B represent the remaining areas where the second transmitter electrode 123 capacitively couples to the first and second receiver electrodes 162 and 163. For the relative position of the shield electrode member shown in FIG. 1, it can be seen that the corresponding capacitively coupled areas 174A and 175A on the first receiver electrode 162 are approximately equal, thus when respective voltage signals of equal and opposite polarity are provided on the first and second transmitter electrodes 122 and 123 in operation, the capacitive coupling to the capacitively coupled areas 174A and 175B will provide approximately equal and opposite signal contributions to the first receiver electrode 162, corresponding to an output signal of approximately zero volts at the first receiver electrode connection 162C. In contrast, for the relative position of the shield electrode member shown in FIG. 1, it can be seen that the corresponding capacitively coupled area 175BA is approximately 3 times the area of the capacitively coupled area [174B+174C] on the second receiver electrode 163. Thus, when respective voltage signals of equal and opposite polarity are provided on the first and second transmitter electrodes 122 and 123 in operation, the capacitive coupling to the capacitively coupled areas [174B+174C] and 175B will provide an output signal at the second receiver electrode connection 163C that has a significant voltage magnitude and a polarity corresponding to the signal polarity provided on the more strongly coupled second transmitter electrode 123.

It should be appreciated that as the shield electrode member 159 is displaced to the left, for example, along the measuring axis/direction 80, the "unscreened" or "unblocked" capacitive coupling from each of the first and second transmitter electrodes 122 and 123 to the second receiver electrode 163 will vary to give rise to a changing voltage output signal at the second receiver electrode connection 163C that has a signal amplitude and polarity that varies as a function of the displacement. In one exemplary embodiment, by using one of the transmitter input signals as a reference signal, the peak amplitude and polarity receiver electrode output signals at a particular time or phase relative to the reference signal may be captured and/or measured by known circuit techniques to provide a position-dependent voltage signal that varies in between a positive and negative value. The position-dependent signal will be periodic with displacement, in correspondence with the wavelength P of the periodically meandering shield electrode 142. Due to the ¾*P offset of the first receiver electrode 162 to the right of the second receiver electrode 163, the position-dependent signal similarly derived from the first receiver electrode connection 162C will follow the spatially periodic position-dependent signal of the second receiver electrode connection 163C with a displacement lag of ¼*P, as the shield electrode member 159 is displaced to the left. Such a relationship between the signals is known as a "quadrature" relationship, as generally known to one of ordinary skill in the art. It should be appreciated that in embodiments where the meandering pattern of the shield electrode 142 is made sinusoidal, the two position-dependent signals will provide sinusoidal quadrature signals, which are advantageous for position interpolation within a given period P of the shield electrode, according to known techniques.

The exemplary embodiment of the signal-balanced electrode configuration 100 shown in FIG. 1 is thus reliably operable according to the principles of this invention. The signal-balanced electrode configuration 100 shown in FIG. 1 may be conveniently and reliably operated with an electrically floating shield electrode 142, if desired. The specific embodiment of the signal-balanced electrode configuration 100 shown in FIG. 1 provides two periodic signals having a conventional quadrature relationship on the first and second receiver electrodes 122 and 123 as the shield electrode member 159 is displaced relative to the transmitter and receiver electrode members 139 and 179 along the measuring axis/direction 80. Any one of a variety of known methods and circuits may be used for providing suitable transmitter signals and processing the resulting quadrature signals to determine desired relative displacement values for such a configuration.

It should be appreciated that, provided that a shield electrode 142 will capacitively couple approximately equally to first and second transmitter electrodes 122 and 123 regardless of its relative position along the measuring axis/direction 80, numerous alternative electrode configurations including either minor or substantial electrode variations are possible. As one simple example, the first and second receiver electrodes 162 and 163 may be repeated at integer wavelength spacings along the measuring axis/direction 80, and the lengths of the first and second transmitter electrodes 122 and 123 increased accordingly, to provide increased signal strength. Furthermore, in addition to a planar/linear configuration, the components shown in FIG. 1 may alternatively be understood to represent parts of a cylindrical encoder, where the measuring axis/direction 80 is a cylindrical or circular measuring axis/direction and the shield electrode configuration 140 represents a segment of an element that continues to form a partial or complete cylindrical configuration along the measuring axis/direction 80. In such a case the X-axis is everywhere along a tangential direction, the Y-axis is parallel to the cylinder axis, and the Z-axis is everywhere in the radial direction. Thus, it will be understood that the configuration disclosed above is illustrative only, and not limiting.

Figure 2:
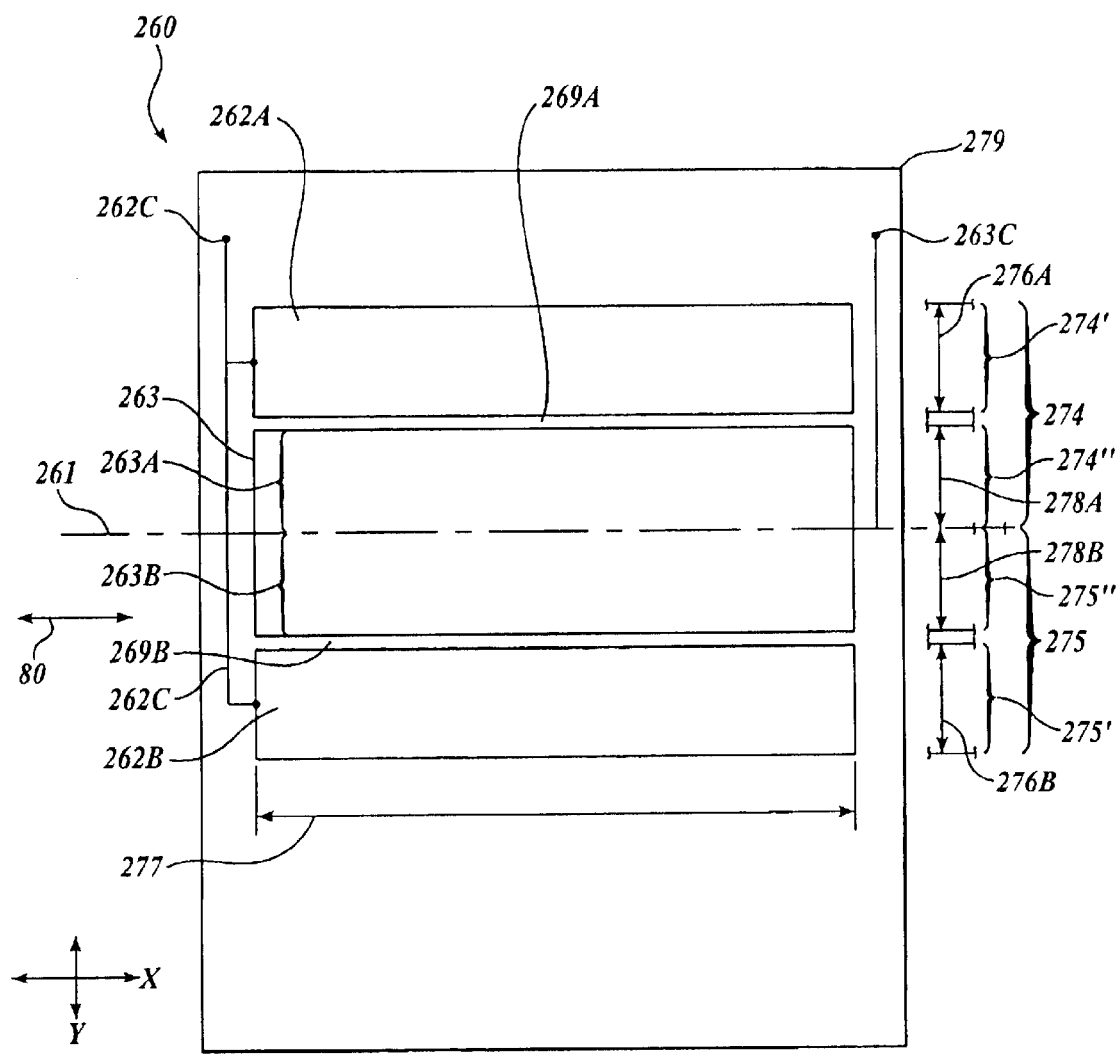
FIG. 2 is a plan view of a receiver electrode configuration usable in a second exemplary embodiment of a signal-balanced electrode configuration according to this invention.
Figure 3:
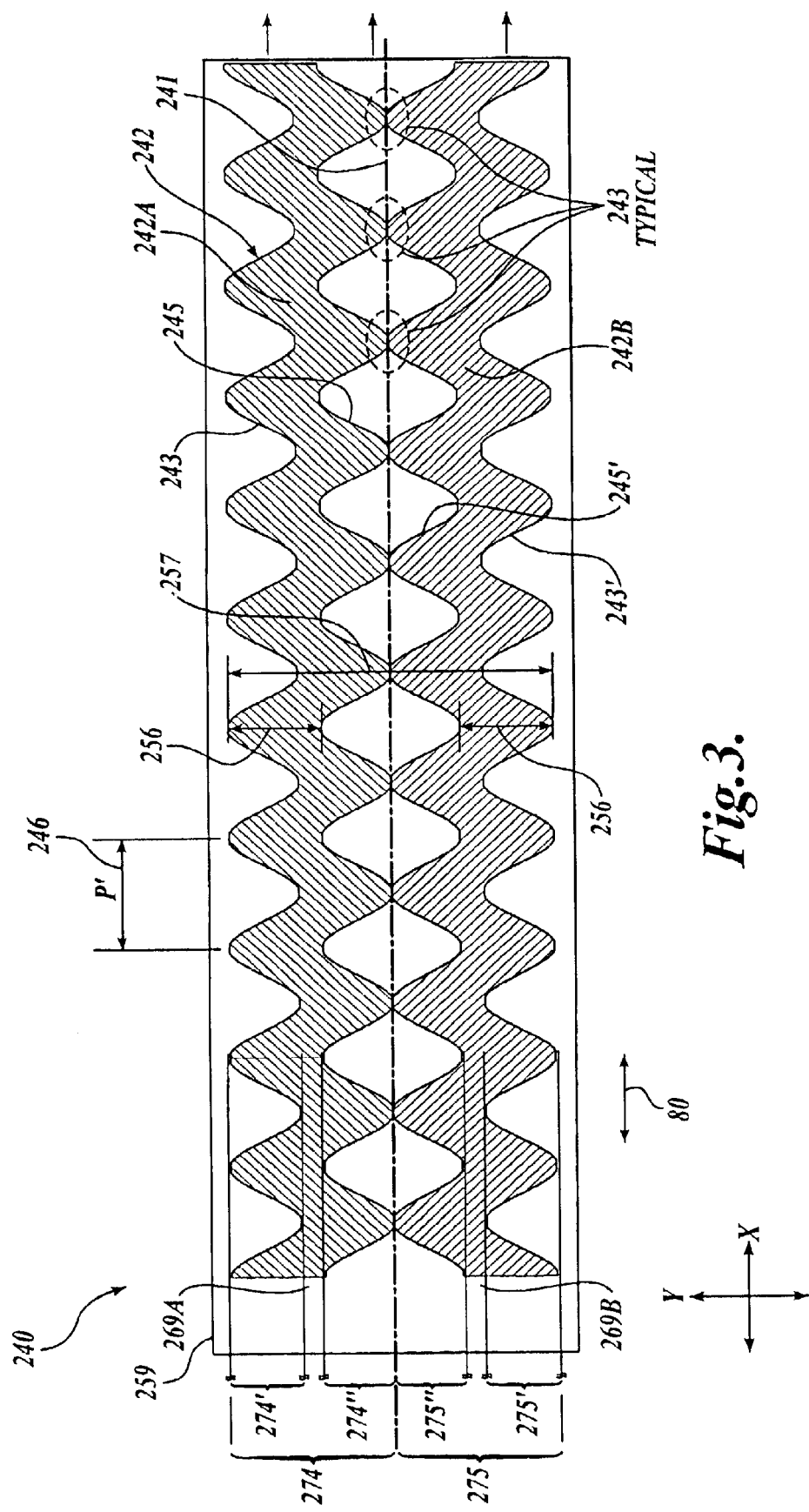
FIG. 3 is a plan view of a shield electrode configuration usable in the second exemplary embodiment of a signal-balanced electrode configuration according to this invention.
Figure 4:
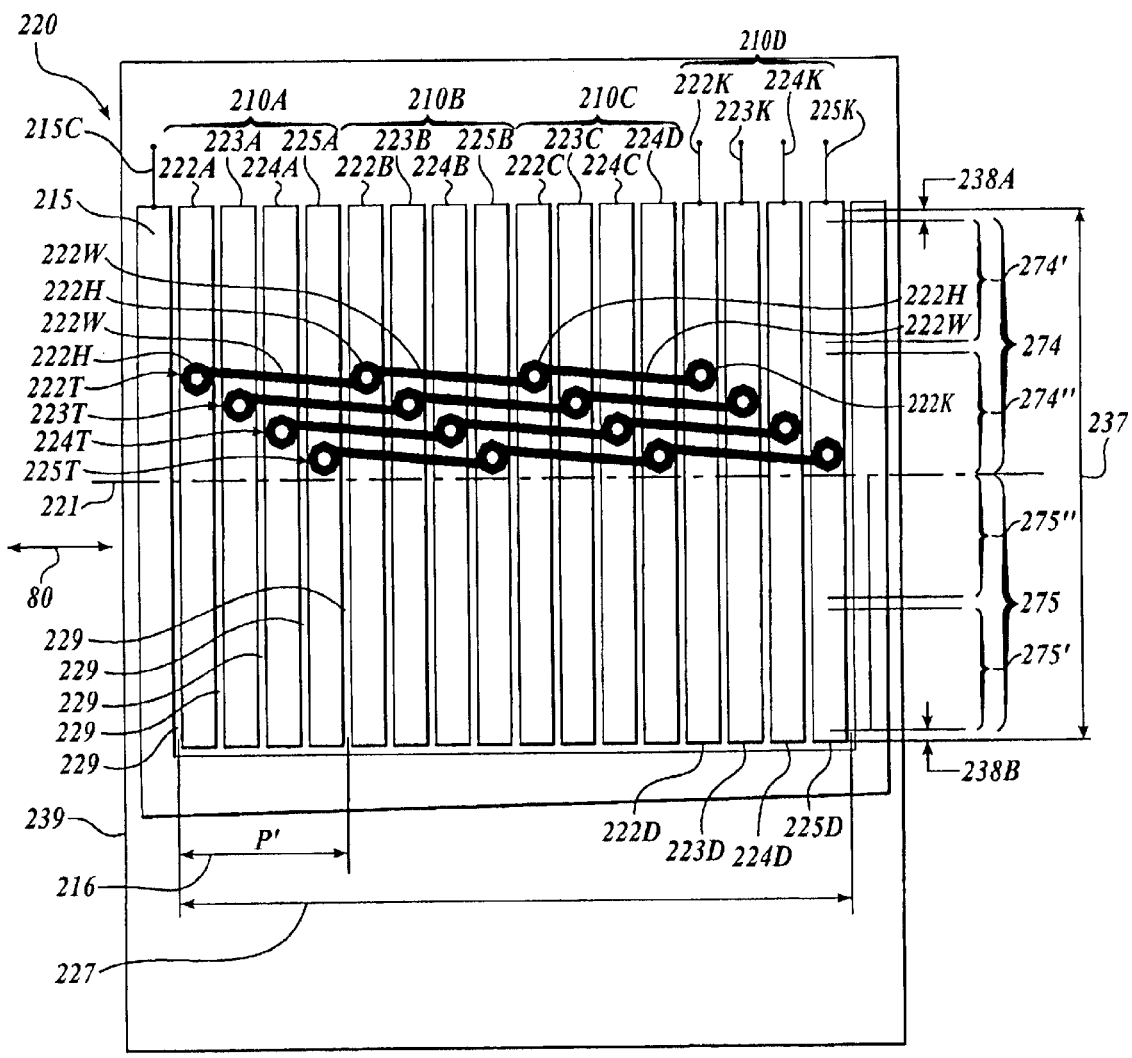
FIG. 4 is a plan view of a transmitter electrode configuration usable in the second exemplary embodiment of a signal-balanced electrode configuration according to this invention.
Figure 5:
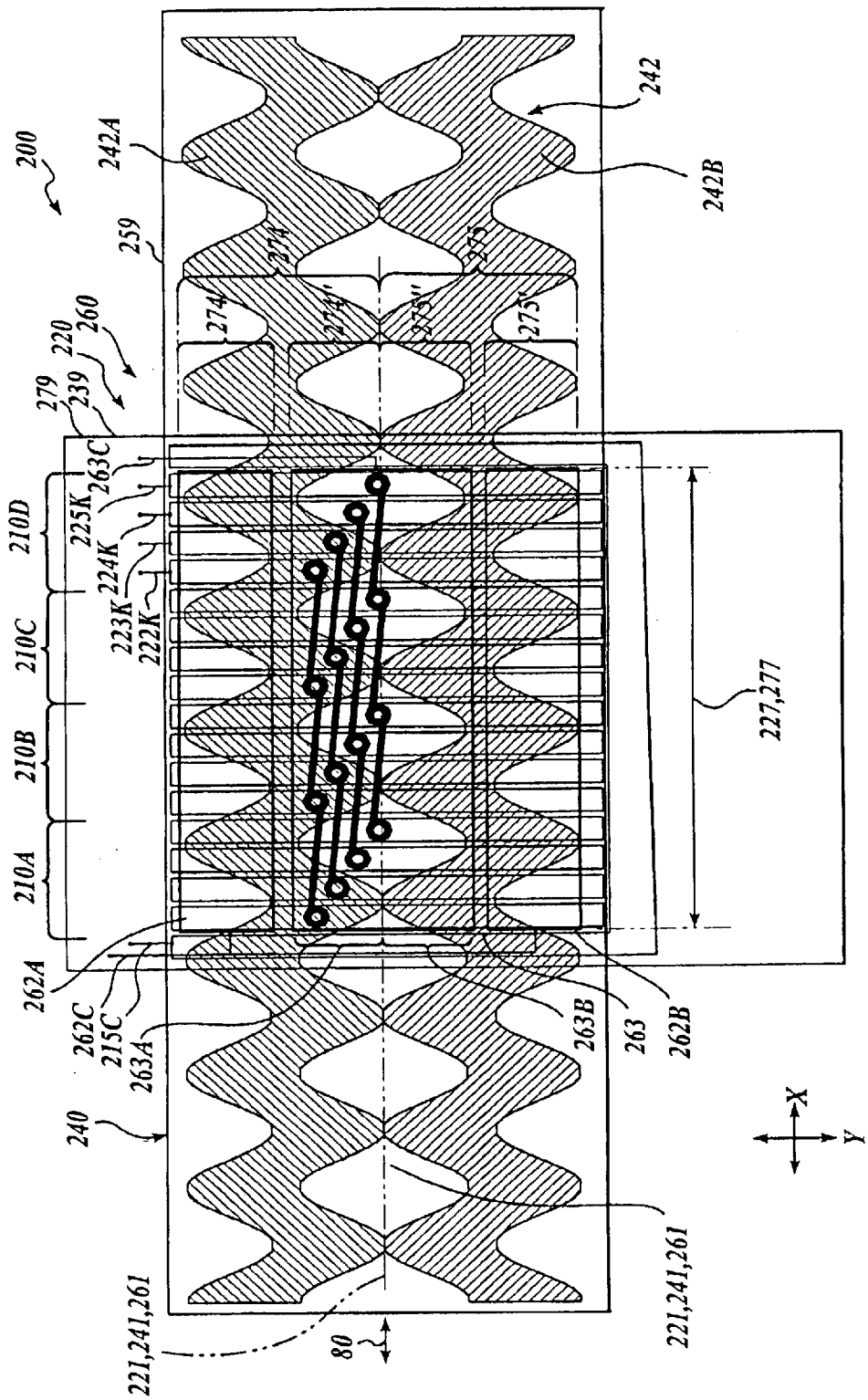
FIG. 5 is a plan view showing the alignment of the receiver electrode configuration of FIG. 2, the shield electrode configuration of FIG. 3, and the transmitter electrode configuration of FIG. 4, for the second exemplary embodiment of a signal-balanced electrode configuration according to this invention.

FIG. 2 shows a plan view of a receiver electrode configuration 260 usable in a second exemplary embodiment of a signal-balanced electrode configuration 200, which is described further in FIGS. 3–5. FIG. 2 shows the previously described X-axis, Y-axis, and measuring axis/direction 80. For convenience of description, it is useful to define an alignment/centerline 261 for the electrode layout of the receiver electrode configuration 260, as shown in FIG. 2. The receiver electrode configuration 260 is carried on a receiver electrode member 279 and includes first receiver electrode portions 262A and 262B that are electrically connected together by a first receiver electrode connection 262C and a second receiver electrode 263 that has a second receiver electrode connection 263C. The first receiver electrode portions 262A and 262B are separated from the second receiver electrode 263 along the Y-axis by the nominally equal gaps 269A and 269B, respectively, and have respective span widths 276A and 276B along the Y-axis direction that are conveniently made equal in the embodiment shown in FIG. 2. For convenience of description, it is useful to define first and second portions 263A and 263B of the second receiver electrode 263 that lie on opposite sides of the alignment/centerline 261 and have respective span widths along the Y-axis direction 278A and 278B that are equal. For convenience of description, it is useful to define first and second receiver electrode coupling tracks 274 and 275, respectively, which lie symmetrically on opposite sides of the alignment/centerline 261 and fall within first and second capacitive coupling zone portions 284 and 285, respectively (described further below.) The first receiver electrode coupling track 274 includes subtracks 274' and 274", which include the first receiver electrode portion 262A and the first portion 263A of the second receiver electrode 263, respectively. The second receiver electrode coupling track 275 includes subtracks 275' and 275", which include the fist receiver electrode portion 262B and the second portion 263B of the second receiver electrode 263, respectively. The first receiver electrode portions 262A and 262B and the second receiver electrode 263 each have the same dimension along the X-axis direction, the electrode group length 277, which is 4 times a wavelength P' (described below) for the embodiment shown in FIG. 2.

FIG. 3 is a plan view of a left end segment of a shield electrode configuration 240 usable in the second exemplary embodiment of a signal-balanced electrode configuration 200, which is described further in FIGS. 4–5. In the exemplary embodiment shown in FIG. 3, the shield electrode configuration 240 is carried on the shield electrode member 259 and includes a shield electrode 242. The shield electrode 242 has a first half 242A and a second half 242B that periodically merge at the regions 243 to electrically connect along an alignment/centerline 241. The first and second halves 242A and 242B each meander in a periodic fashion along the measuring axis/direction 80 to form a periodic sinusoidal pattern extending along the measuring axis/direction 80. The periodic pattern has a wavelength or pitch P', which is also indicated by the dimension 246 in FIG. 3, along the measuring axis/direction 80. The shield electrode first half 242A has a first shield electrode border 243 and a second shield electrode border 245 that are separated along the Y-axis direction by a constant effective shield electrode half-width 256. The shield electrode second half 242B similarly has a first shield electrode border 243' and a second shield electrode border 245' that are separated along the Y-axis direction by the same constant effective shield electrode half-width 256. It should be appreciated that the second shield electrode borders 245 and 245' are "interrupted" by the previously described electrode-merging connections at each of the regions 243. The shield electrode 242 also has a shield electrode span width 257 along the Y-axis direction that encompasses the extents of the shield electrode and is conveniently made constant along the measuring axis/direction 80 as shown in FIG. 3.

In operation, the alignment/centerline 241 of the shield electrode configuration 240 is aligned with the alignment/centerline 261 of the receiver electrode configuration 260 such that the various portions of the shield electrode first half 242A are aligned with the first receiver electrode coupling track 274, the subtracks 274' and 274" and the gap 269A and various portions of the shield electrode second half 242B are aligned with the second receiver electrode coupling track 275, the subtracks 275' and 275", and the gap 269B, all approximately as shown in FIG. 3. Thus, it should be appreciated that the various Y-axis dimensions of the shield electrode configuration 240 are dimensioned relative to the various Y-axis dimensions of the receiver electrode configuration 260 such that the alignment/centerline 241 can be slightly misaligned along the Y-axis relative to the alignment/centerline 261 and the various capacitive coupling areas between the shield electrode configuration 240 and the receiver electrode configuration 260 will tend to be relatively unchanged by the slight misalignment. For larger misalignments, it should be appreciated that, relative to nominal alignment, capacitive coupling area lost or gained in the subtracks 274' and 274" due to a given lateral misalignment will tend to be oppositely and compensatingly gained or lost in the subtracks 275' and 275" for that same misalignment, due to the symmetrical configurations of the shield electrode configuration 240 and the receiver electrode configuration 260. Furthermore, the effects of "roll" misalignment about an axis parallel to the measuring axis will also tend to affect the signals output on the receiver electrode connections 215C and 216C by similar amounts. Thus, the signal-balanced electrode configuration 200, which is described further in FIGS. 4–5, provides a particularly robust design with respect to preserving measurement accuracy despite various alignment errors during assembly and operation.

FIG. 4 is a plan view of a transmitter electrode configuration 220 usable in the second exemplary embodiment of a signal-balanced electrode configuration 200, which is described further in FIG. 5. In the exemplary embodiment shown in FIG. 4, the transmitter electrode configuration 220 is carried on transmitter electrode member 239, which may be a printed circuit board for example, carrying four transmitter electrode groups 210A–210D. The first transmitter electrode group 210A has first, second, third and fourth transmitter electrodes 222A–225A, the second transmitter electrode group 210B has first, second, third and fourth transmitter electrodes 222B–225B, and so on, as shown in FIG. 4. The four transmitter electrode groups 210A–210D have similar overall dimensions and are repeated periodically along the measuring axis/direction 80 according to transmitter electrode group pitch 216 which is equal to the wavelength P'. An overall transmitter electrode group length 227 is thus 4 times the wavelength P' for the embodiment shown in FIG. 4. A surrounding circuit ground plane electrode 215 having a circuit ground plane electrode connection 215C includes portions located adjacent to the end transmitter electrodes 222A and 225D, in order to make their operational capacitive coupling more similar to that of the interior transmitter electrodes, which are surrounded by neighboring transmitter electrodes on both sides along the measuring axis/direction 80.

Within each of the transmitter electrode groups 210"X", as exemplified by the transmitter electrode group 210A in FIG. 4, each of the transmitter electrodes 222X–225X have the same X-axis dimensions, and conveniently have the same Y-axis dimension (although the same Y-axis dimension is not a requirement in various other exemplary embodiments.) Each of the transmitter electrodes 222X–225X are fabricated on a first side of an insulating substrate, such as a printed circuit board substrate. They are separated by similar insulating gaps 229 along the measuring axis/direction 80, which are advantageously as narrow as practical in various exemplary embodiments. Thus, the transmitter electrodes 222X–225X are of equal sizes and are uniformly distributed within the transmitter electrode group pitch 216 along the measuring axis/direction 80.

The first transmitter electrodes 222A–222D are all electrically interconnected in conventional fashion by conductive through holes 222H and wiring traces 222W located on a second side of the insulating substrate, for example as shown in FIG. 4. The electrically interconnected first transmitter electrodes 222A–222D are provided with a first transmitter electrode connection 222K. Each of the sets of second transmitter electrodes 223A–223D, third transmitter electrodes 224A–224D and forth transmitter electrodes 225A–225D are similarly interconnected and each is similarly provided with respective second, third and fourth transmitter electrode connections 223K, 224K and 225K.

Also shown in FIG. 4 is an alignment/centerline 221 for the transmitter electrode configuration 240, and the relative location of the capacitive coupling tracks 274 and 275 and their respective subtracks 274' and 274", and 275' and 275", for a nominally aligned transmitter electrode configuration 240. It should be appreciated that the transmitter electrode configuration 220 is provided with a transmitter electrode span width 237 along the Y-axis that encompasses the shield electrode 242 and all of the receiver electrodes 262A, 262B and 263 and provides additional width margins 238A and 238B such that it will encompass the shield electrode 242 and all of the receiver electrodes 262A, 262B and 263 regardless of any expected misalignment along the Y-axis, in order that such misalignments will not affect the capacitive coupling from the transmitter electrodes to any of the other electrodes of the signal-balanced electrode configuration 200, and especially will not affect the capacitive coupling from the transmitter electrodes to the shield electrode 242.

FIG. 5 is a plan view showing the operational alignment of the receiver electrode configuration 260 of FIG. 2, the shield electrode configuration 240 of FIG. 3, and the transmitter electrode configuration 220 of FIG. 4, for the second exemplary embodiment of a signal-balanced electrode configuration 200 according to this invention.

In operation, the transmitter electrode member 239, the shield electrode member 259, and the receiver electrode member 279 are arranged such that the alignment/centerlines 221, 241 and 261 are nominally aligned along the Z-axis (the direction normal to the X-Y plane), and the transmitter electrode configuration 220 and the receiver electrode configuration 260 are positioned along the measuring axis/direction 80 such that the receiver electrode group length 277 coincides with the overall transmitter electrode group length 227. For the configuration shown in FIG. 5, the receiver electrode member 279 is positioned to the far side of the arrangement along the Z-axis, with the operational receiver electrodes facing up, the transmitter electrode member 239 is positioned to the near side of the arrangement, with the operational transmitter electrodes facing down, and the shield electrode member 259 is positioned between them. The transmitter electrode member 239 and the receiver electrode member 279 are arranged in a fixed relationship with an operable and uniform capacitive gap between them along the Z-axis, the capacitive gap being somewhat greater than the thickness of the shield electrode member 159 along the Z-axis such that the shield electrode member 159 may be moved along the measuring axis/direction 80 in the capacitive gap.

It should be appreciated that during operation, in order for the shield electrode 242 to capacitively couple approximately equally to the various transmitter electrodes 222X–225X of the transmitter electrode configuration 220, regardless of its relative position along the measuring axis/direction 80 according to one aspect of this invention, and to provide the best practical accuracy, the shield electrode member 259 should be guided along the measuring axis/direction 80 such that the shield electrode 242 is maintained with the most uniform gap and alignment that is practical and/or economical relative to the transmitter electrode configuration 220. It should be appreciated that the operable capacitive gap between the transmitter electrode member 239 and the receiver electrode member 279 that establishes the best tradeoff between signal strength and measurement errors due to various potential misalignments can be established by analysis and/or confirmed experiment for the signal-balanced electrode configuration 200, as previously discussed with reference for FIG. 1.

Similarly to the signal-balanced electrode configuration 100, for the configuration of the signal-balanced electrode configuration 200 shown in FIG. 5, when there is an approximately uniform operating gap along the Z-axis direction between the transmitter electrode configuration 220 and the shield electrode configuration 240, the shield electrode configuration 240 will capacitively couple approximately equally to each of the transmitter electrodes regardless of their relative position along the measuring axis/direction 80, providing one aspect of a signal-balanced electrode configuration according to the principles of this invention. In operation, a sinusoidal AC voltage signal having 0 degrees of temporal phase shift is applied to the interconnected electrodes 222×through the respective first electrode connection 222K. Similarly, respective similar sinusoidal AC voltage signals having 90, 180, and 270 degrees of temporal phase shift are applied to the interconnected electrodes 223X, 224X and 225X, respectively, through the respective second, third and fourth transmitter electrode connections 223K, 224K and 225K. For such a configuration of transmitter signals, it should be appreciated that the 0 and 180 degree pair of transmitter signals and the 90 and 270 degree pair of transmitter signals each provide signals of equal magnitude and opposite polarity and because they are equally capacitively coupled to the shield electrode 242, their respective contributions to the response voltage arising on the shield electrode 242 will likewise be of equal and opposite polarity. Accordingly, the signals thus balance each other to provide no net change in the voltage of the electrically floating shield electrode 242, according to the principles of this invention. In various exemplary embodiments, the shield electrode 242 will thus be maintained at a DC voltage determined by the transmitter signals, which may be zero volts in various exemplary embodiments. As previously discussed, according to the principles and configurations disclosed herein, when a shield electrode maintains no net change in its voltage, at least at each time that the transducer provides a displacement measurement signal, then the shield electrode itself will not contribute to any erroneous voltage-related signal variations on the receiver electrodes. Accordingly, it will act as desired, that is, simply as a displacement-dependent screening or blocking element between the transmitter and receiver electrodes.

Regarding another aspect of operation of the signal-balanced electrode configuration 200, when there is an approximately uniform operating gap along the Z-axis direction between the previously described transmitter electrode configuration 220 and receiver electrode configuration 260, in the hypothetical absence of the shield electrode 242, each of the transmitter electrodes of the transmitter electrode groups 210A–210D will capacitively couple approximately equally to the receiver electrodes 262A, 262B and 263. Thus, when two pairs of similar sinusoidal AC voltage signals of equal and opposite polarity are provided on the four transmitter electrodes in each of the transmitter electrode groups 210A–210D, their respective contributions to the voltage arising on the receiver electrodes 262A, 262B and 263 will be equal, thus balancing each other to provide no net change in the respective signals provided by the receiver electrodes 262A, 262B and 263. In various exemplary embodiments, the signals from the first and second receiver electrode connections 262C and 263C would thus be constant at a DC voltage determined by the transmitter signals, which may be zero volts in various exemplary embodiments, in the hypothetical absence of the shield electrode 242. This tends to reduce or eliminate certain signal errors that may otherwise arise in the measurement signals provided using various signal-balanced electrode configurations according to this invention.

Another aspect of operation of the signal-balanced electrode configuration 200, is explained with reference to the capacitive coupling between the transmitter electrodes of the transmitter electrode groups 210A–210D and the receiver electrode 262A, and the second receiver electrode portion 263A, along the capacitive coupling tracks 274' and 274", respectively. As shown in FIG. 5, the capacitive coupling area between the transmitter electrodes of the transmitter electrode groups 210A–210D and the receiver electrode 262A along the capacitive coupling track 274' that is not effectively screened by the shield electrode portion 242A varies sinusoidally along the measuring axis/direction 80. Accordingly, at any position relative to the shield electrode 242 along the measuring axis/direction 80, the signal contributions on the receiver electrode 262A include those arising from the 0 degree AC signal on the transmitter electrodes 222xtimes the portion of the sinusoidal capacitive coupling area corresponding to the transmitter electrodes 222X, and similarly those arising from the respective 90, 180, and 270 degree AC signals on the transmitter electrodes 223X, 224X and 225X, respectively, times their respective portions of the sinusoidal capacitive coupling areas corresponding to the transmitter electrodes 223X, 224X and 225X, respectively. These signal contributions are effectively summed on the receiver electrode 262A, to give rise to a net sinusoidal AC voltage signal on the receiver electrode 262A.

It should be appreciated that this net sinusoidal AC voltage signal on the receiver electrode 262A will have a net temporal phase determined by the relative strength or magnitude of the various "unscreened" capacitive coupling areas of the various transmitter electrodes 222X–225X. The net temporal phase of the net sinusoidal AC voltage signal is thus determined by the relative position of the shield electrode 242 along the measuring axis/direction 80, and the net temporal phase of the net sinusoidal AC voltage signal is thus indicative of the relative position. It should be appreciated that due to the periodic sinusoidal variation of the shape of the capacitive coupling area along the capacitive coupling track 274', the net temporal phase of the net sinusoidal AC voltage signal will vary as an approximately linear function of the relative position of the shield electrode 242 along the measuring axis/direction 80.

It should be appreciated that the capacitive coupling between the transmitter electrodes of the transmitter electrode groups 210A–210D and the second receiver electrode portion 263A along the capacitive coupling track 274" is similar to the previous description regarding the capacitive coupling track 274', except that due to the configuration of the shield electrode portion 242A the capacitive coupling along the capacitive coupling track 274" that is not effectively screened by the shield electrode portion 242A has a spatial phase shift of 180 degrees, that is, one half of the wavelength P' along the measuring axis/direction 80, relative to that provided along the capacitive coupling track 274'. Thus, the net temporal phase of a net sinusoidal AC voltage signal arising on the second receiver electrode portion 263A will vary as an approximately linear function of the relative position of the shield electrode 242 along the measuring axis/direction 80, and the net temporal phase of that net sinusoidal AC voltage signal will be shifted 180 degrees of temporal phase shift relative to the net temporal phase of the signal arising on the receiver electrode 262A.

As will be apparent to one of ordinary skill in the art, due to the symmetry of the electrode configurations of the signal-balanced electrode configuration 200, along the capacitive coupling track 275" the signal arising on the second receiver electrode portion 263B at any relative position of the shield electrode 242 will nominally be identical to that arising on the second receiver electrode portion 263A and the sum of these signals will be available at the second receiver electrode connection 263C. Similarly, along the capacitive coupling track 275' the signal arising on the first receiver electrode portion 262B at any relative position of the shield electrode 242 will nominally be identical to that arising on the first receiver electrode portion 262A and the sum of these signals will be available at the first receiver electrode connection 262C.

As previously outlined, for various misalignments along the Y-axis misalignments it should be appreciated that, relative to nominal alignment, capacitive coupling area lost or gained in the subtracks 274' and 274" due to a given misalignment will tend to be oppositely and compensatingly gained or lost in the subtracks 275' and 275" for that same misalignment, due to the symmetrical configurations of the shield electrode configuration 240 and the receiver electrode configuration 260. Thus, the signal at the first receiver electrode connection 262C that is effectively the sum of the signal contributions for the capacitive coupling tracks 274' and 274" will tend to be stable despite reasonably expected misalignments along the Y-axis and the signal at the second receiver electrode connection 263C that is effectively the sum of the signal contributions for the capacitive coupling tracks 275' and 275" will tend to be stable despite reasonably expected misalignments along the Y-axis.

As described above, in operation, the signals output on the first and second receiver electrode connections 262C and 263C will have nominally equal and opposite signal magnitudes. In various exemplary embodiments, these signals are sampled and input to a differential amplifier configuration which provides a measurement signal that is the amplified difference between the two signals, thus doubling the position measurement signal and removing various common mode errors that may be included in the receiver electrode signals. The differential measurement signal will have a temporal phase shift relative to a reference phase of signals input to the transmitters, that indicates the position of the shield electrode 242 relative to the transmitter and receiver electrode configurations 220 and 260, within a particular current wavelength P'.

The exemplary embodiment of the signal-balanced electrode configuration 200 shown in FIGS. 2–5 is thus reliably operable according to the principles of this invention. The signal-balanced electrode configuration 200 may be conveniently and reliably operated with an electrically floating shield electrode 242, if desired. The specific embodiment of the signal-balanced electrode configuration 200 described above with reference to FIGS. 2–5 provides a position signal having a temporal phase shift that varies approximately linearly as the shield electrode member 259 is displaced relative to the transmitter and receiver electrode members 239 and 279 along the measuring axis/direction 80. Any one of a variety of known methods and circuits may be used for providing suitable transmitter signals and processing the resulting output signals to determine desired relative displacement values for such a configuration. For example, one of ordinary skill in the art can readily adapt various circuits and signal processing techniques disclosed in U.S. Pat. No. 4,879,508, to Andermo, which is incorporated herein by reference in its entirety, to provide circuits and signal processing techniques that are suitable for the various embodiments disclosed herein.

It should be appreciated that, provided that a shield electrode 242 will capacitively couple approximately equally to each of the transmitter electrodes 222X–225X regardless of its relative position along the measuring axis/direction 80, numerous alternative electrode configurations including either minor or substantial electrode variations are possible while preserving the previously described advantages and features of the signal-balanced electrode configuration 200. As a first example, it should be appreciated that although the foregoing embodiment provides two receiver electrode signals that are suitable for differential signal processing, that it is possible to omit one or the other of these signals and their associated receiver electrode in various exemplary embodiments. The remaining receiver electrode and receiver electrode signal will still provide a sinusoidal AC voltage signal having a net temporal phase that will vary as an approximately linear function of the relative position of the shield electrode 242 along the measuring axis/direction 80 to provide an operable signal-balanced electrode configuration according to this invention. Only the certain common mode error rejection features will be lost. It should be appreciated that such a single-electrode receiver electrode configuration can be similarly adapted by one of ordinary skill in the art to provide an alternative embodiment for the dual-receiver electrode configurations described below with reference to the signal-balanced electrode configurations 300–600.

As a second example, in one alternative embodiment that is otherwise similar to the previously described signal-balanced electrode configuration 200, a three-phase transmitter electrode configuration is used. In such an alternative embodiment, each of the transmitter electrode groups 210 includes 3 transmitter electrodes, instead of 4 transmitter electrodes, the 3 transmitter electrodes in each group distributed evenly over one period P' of the signal-balanced electrode configuration. By analogy with the foregoing description, the three transmitter electrodes in each group are generically designated here as electrodes 222'X, 223'X and 224'X. In operation, a respective sinusoidal AC voltage signal having 0 degrees of temporal phase shift is applied to the interconnected electrodes 222'X. Respective similar sinusoidal AC voltage signals having 120 and 240 degrees of temporal phase shift are applied to the interconnected electrodes 223'X, 224'X, respectively. Such a configuration of transmitter signals, will also operate to provide a position signal having a temporal phase shift that varies approximately linearly as the shield electrode member 259 is displaced relative to the transmitter and receiver electrode members 239 and 279 along the measuring axis/direction 80, as previously described. Furthermore, for such a configuration of transmitter signals, it should be appreciated that because they are equally capacitively coupled to the shield electrode 242, their respective contributions to the response voltage arising on the shield electrode 242 will sum to zero. Accordingly, such 3-phase signals thus balance each other to provide no net change in the voltage of the electrically floating shield electrode 242, according to the principles of this invention. It should be appreciated that an analogous 3-phase configuration of transmitter electrodes can be similarly adapted by one of ordinary skill in the art to provide an alternative embodiment for various 4-phase transmitter electrode configurations described below with reference to the signal-balanced electrode configurations 300–600.

Furthermore, in addition to a planar/linear configuration, the components shown in FIGS. 2–5 may alternatively be understood to represent parts of a cylindrical encoder, where the measuring axis/direction 80 is a cylindrical or circular measuring axis/direction and the shield electrode configuration 140 represents a segment of an element that continues to form a partial or complete cylindrical configuration along the measuring axis/direction 80, as previously described with reference to the signal-balanced electrode configuration 100.

These and other alternative electrode configurations including either minor or substantial electrode variations are possible while preserving the previously described advantages and features of the signal-balanced electrode configuration 200. Thus, it will be understood that the configuration of the signal-balanced electrode configuration 200 disclosed above is illustrative only, and not limiting.

Figure 6:
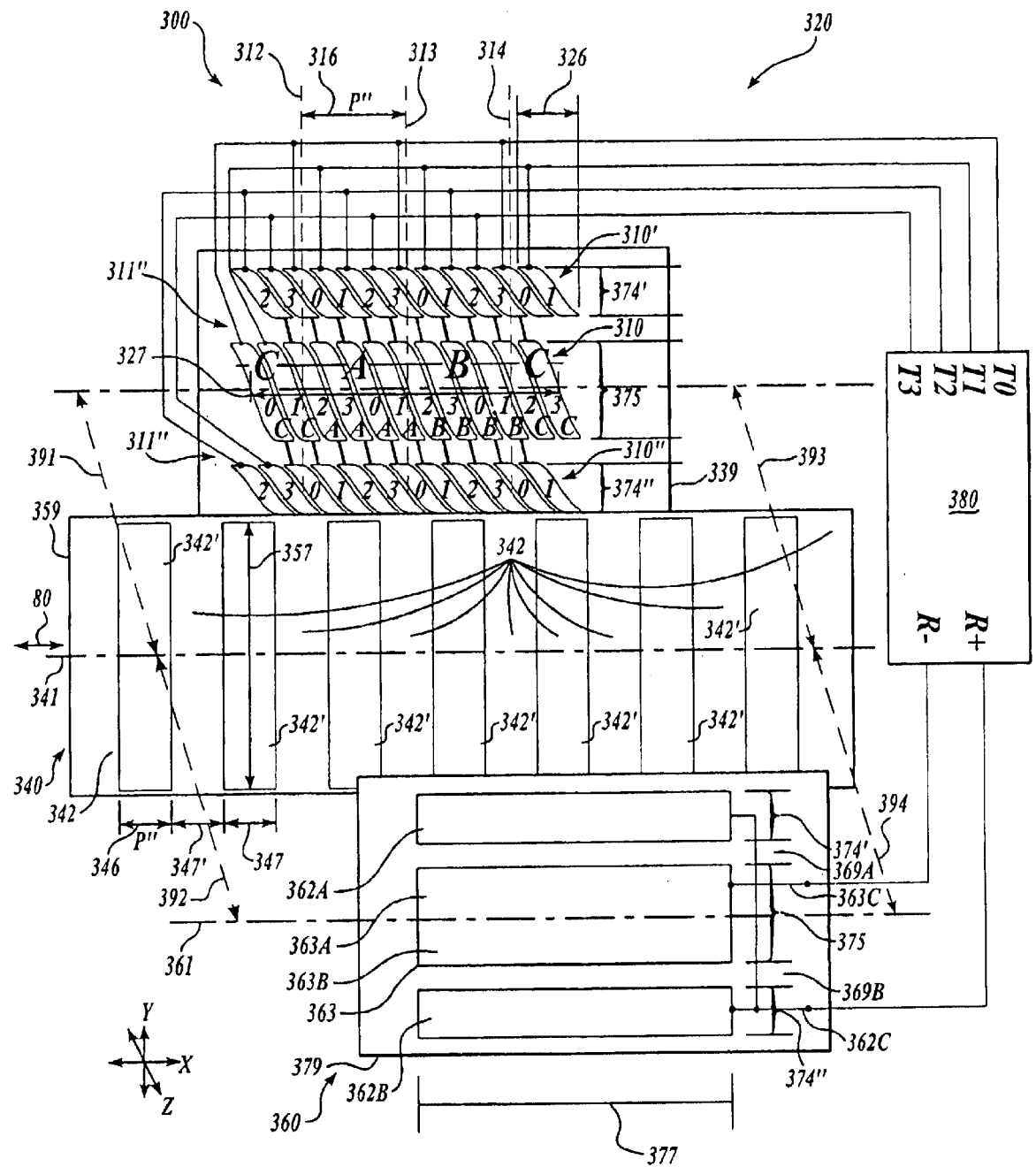
FIG. 6 is an exploded view of a third exemplary embodiment of a signal-balanced electrode configuration according to this invention that is usable in a capacitive encoder according to this invention.
Figure 7:
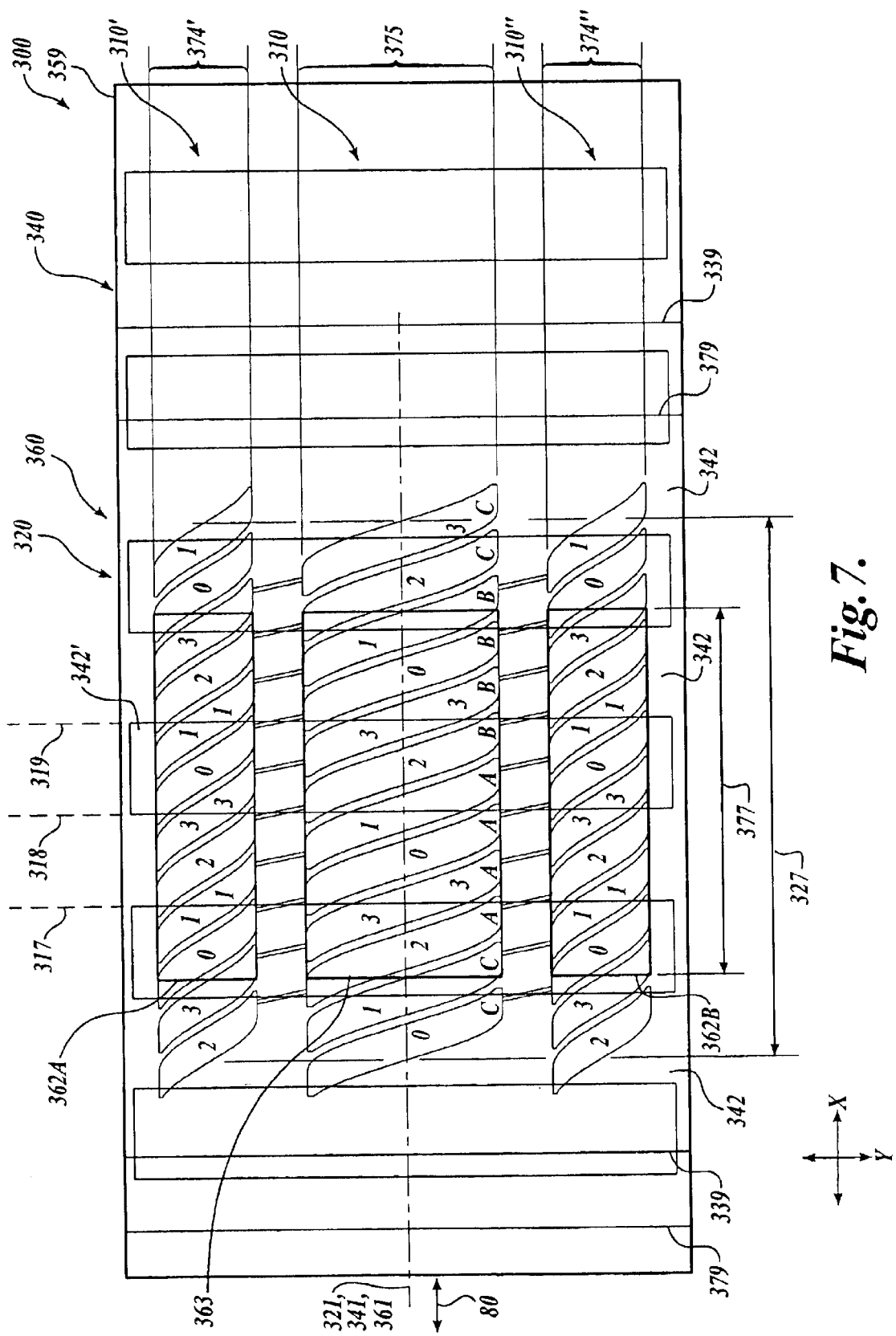
FIG. 7 is a plan view showing the alignment of the receiver electrode configuration, the shield electrode configuration and the transmitter electrode configuration of FIG. 6, for the third exemplary embodiment of a signal-balanced electrode configuration according to this invention.

FIGS. 6 and 7 illustrate a third exemplary embodiment of a signal-balanced electrode configuration 300 according to this invention that is usable in a capacitive encoder according to this invention. FIG. 6 is an exploded view of the third exemplary embodiment of a signal-balanced electrode configuration 300 according to this invention, and FIG. 7 is a plan view showing the operational alignment of the receiver electrode configuration 360, the shield electrode configuration 340, and the transmitter electrode configuration 320, for the third exemplary embodiment of a signal-balanced electrode configuration 300 according to this invention.

The signal-balanced electrode configuration 300 has many elements and operating characteristics that are similar to those of the previously described signal-balanced electrode configuration 200. Such similarities will be understood by one of ordinary skill in the art, thus, only significantly different elements and operating characteristics will be described in detail below. As shown in FIG. 6, the third exemplary embodiment of a signal-balanced electrode configuration 300 includes a transmitter electrode configuration 320 carried on a transmitter electrode member 339, a shield electrode configuration 340 carried on a shield electrode member 359 (a representative segment of which is shown in FIG. 6), and a receiver electrode configuration 360 carried on a receiver electrode member 379.

The receiver electrode configuration 360 includes first receiver electrode portions 362A and 362B that are electrically connected together by a first receiver electrode connection 362C and a second receiver electrode 363 that has a second receiver electrode connection 363C. The first receiver electrode portions 362A and 362B are separated from the second receiver electrode 363 along the Y-axis by the nominally equal gaps 369A and 369B, respectively, and have respective span widths along the Y-axis direction that are conveniently made equal in the embodiment shown in FIG. 6. For convenience of description, it is useful to define first and second portions 363A and 363B of the second receiver electrode 363 that lie on opposite sides of the alignment/centerline 361 and have respective span widths along the Y-axis direction that are equal. The first receiver electrode portions 362A and 362B and the second receiver electrode 363 each have the same dimension along the X-axis direction, the receiver electrode group length 377, which is 2 times a wavelength P" (described below) for the embodiment shown in FIG. 6. For convenience of description, it is useful to define receiver electrode coupling tracks 374', 374" and 375, which extend along the measuring axis/direction 80 and are located along the Y-axis to coincide with the span of the various receiver electrodes, as shown in FIG. 6.

In contrast to the previously described shield electrodes that meander in a periodic fashion along the measuring axis direction, the shield electrode configuration 340 shown in FIG. 6 includes a shield electrode element having approximately rectangular portions 342 that alternate with approximately rectangular portions 342' along the measuring axis/direction 80, to form a periodic pattern having a wavelength or pitch P''', which is also indicated by the dimension 346 in FIG. 6. The portions 342' have a span width 357 along the Y-axis direction that encompasses the extents of operably aligned electrodes of both the transmitter electrode configuration 320 and the receiver electrode configuration 360, and is conveniently made constant along the measuring axis/direction 80 as shown in FIG. 6. In one exemplary embodiment of the shield electrode configuration 340, the shield electrode member 359 is an insulating printed circuit board material and the portions 342' are conventionally-fabricated conductive portions on the printed circuit board, while the portions 342 are the insulating printed circuit board material of the shield electrode member 359. In an alternative embodiment, the portions 342' are the insulating printed circuit board material and the portions 342 are conductive portions. In yet another embodiment, the shield electrode member 359 is conductive strip, tape, or bar, that is punched, machined, or etched through in the portions 342', the remaining conductive material forming the portions 342.

It should be appreciated that in operation, similarly to the signal-balanced electrode configuration 200, the alignment/centerline 341 of the shield electrode configuration 340 is aligned with the alignment/centerline 361 of the receiver electrode configuration 360, and the Y-axis dimensions of the shield electrode configuration 240 are dimensioned relative to the various Y-axis dimensions of the receiver electrode configuration 360 such that the alignment/centerline 341 can be somewhat misaligned along the Y-axis relative to the alignment/centerline 361 and the various capacitive coupling areas between the shield electrode configuration 340 and the receiver electrode configuration 360 will tend to be relatively unchanged by the misalignment, as best seen in FIG. 7.

It should be appreciated that despite substantial differences in electrode geometry, the transmitter electrode configuration 320, shown in FIGS. 6 and 7, is electrically connected and operated in a manner very similar to the previously described transmitter electrode configuration 220. The differences in geometry are due to the fact that for the signal-balanced electrode configuration 300 the transmitter electrode configuration 320 is arranged to provide a sinusoidal capacitive coupling variation vs. displacement, whereas this sinusoidal capacitive coupling variation was provided by the shield electrode configuration 240, not the transmitter electrode configuration, in the signal-balanced electrode configuration 200.

As best seen in FIG. 6, the transmitter electrode configuration 320 includes a transmitter electrode member 359, which may be a printed circuit board for example, carrying three transmitter electrode group regions A–C, nominally demarcated by the dashed reference lines 312–314 in FIG. 6. Corresponding to the capacitive coupling track 375 of the transmitter electrode configuration 320, the first transmitter electrode group region A includes primarily, from left to right in FIG. 6, second, third, fourth and first transmitter electrodes 2A, 3A, 4A and 1A; the second transmitter electrode group region B has second, third, fourth and first transmitter electrodes 2B, 3B, 4B and 1B, and the third transmitter electrode group region C is similarly arranged, except that it is conveniently split into "left and right portions" that flank the transmitter electrode group regions A and B, as shown in FIG. 6. The three transmitter electrode group regions A–C have nominally equal net functional dimensions (ignoring the convenient split layout of the group region C) and are repeated periodically along the measuring axis/direction 80 according to a transmitter electrode group pitch 316 which is equal to the wavelength P'''. An overall transmitter electrode group length 327 is thus 3 times the wavelength P''' for the embodiment shown in FIGS. 6 and 7.

It should be appreciated that each of the transmitter electrodes arranged along the capacitive coupling track 375 have identical dimensions, and each individual electrode is shaped such that its width dimension along the Y-axis at each point along the measuring axis/direction 80 is a sinusoidal function of that position, going through one half of a sinusoidal cycle over the total electrode length of approximately P'''/2 along the measuring axis/direction 80. This corresponds to the characteristic "S" appearance of the transmitter electrodes in FIGS. 6 and 7.

Regarding the transmitter electrodes arranged along the capacitive coupling tracks 374' and 374'', respectively, it should be appreciated that these transmitter electrodes are arranged, sized and shaped in a manner that is completely analogous to the foregoing description for the transmitter electrodes arranged along the capacitive coupling track 375, with one geometrical exception: The transmitter electrodes arranged along each of the capacitive coupling tracks 374' and 374'', respectively, have a width dimension along the Y-axis at each point along the measuring axis/direction 80 that is nominally one-half of the corresponding width dimension of the transmitter electrodes arranged along the capacitive coupling track 375.

The functional electrical connection of the electrodes is shown schematically in FIG. 6. It should be appreciated that some electrical connections are schematically routed in series through various electrodes in FIG. 6, as indicated by connecting lines located in the zones indicated by the reference numbers 311' and 311''. The reference numbers 0–3, shown on each transmitter electrode in FIGS. 6 and 7, indicate which electrodes are connected to each of the similarly numbered transmitter signal sources T0–T3 provided by a transducer electronic circuit 380. In operation, a sinusoidal AC voltage signal having 0 degrees of temporal phase shift is applied to the interconnected electrodes numbered 0. Similarly, respective similar sinusoidal AC voltage signals having 90, 180, and 270 degrees of temporal phase shift are applied to the electrodes numbered 1, 2, and 3, respectively.

As best seen in FIG. 7, it should be appreciated that opposite-phase transmitter electrodes, for example the "0" and "2" transmitter electrodes, are always aligned "side-by-side" with each other along the Y-axis direction, and extend over the same span along the measuring axis/direction 80. Furthermore, each "0" transmitter electrode, for example, along the central capacitive coupling track 375 is always aligned with two opposite-phase "2" transmitter electrodes along the outer capacitive coupling tracks 374' and 374'', respectively, which each having one half of the effective width and/or area of the central "0" transmitter electrode. This "balancing" arrangement holds true for each "number/type" of transmitter electrode at each location along the measuring axis direction. Furthermore, as previously mentioned, each transmitter electrode has a total span of P'''/2 along the measuring axis/direction 80, which matches the span of each of the portions 42 and 42' of the shield electrode configuration 340.

For such a configuration of transmitter electrodes and signals, it should be appreciated that the net capacitive signal coupling to any of the individual portions 342 or 342', whichever is a shield electrode portion in a given embodiment, or their sum, will always be balanced, according to the principles of this invention. For example, with reference to a shield electrode portion 342' located between the dashed reference lines 318 and 319 in FIG. 7, it can be seen that along a vertical direction approximately through the center of that shield electrode portion 342' the 0 and 180 degree pair of transmitter signals on the 0 and 2 transmitter electrodes, respectively, will each provide signals of equal magnitude and opposite polarity and because they are equally capacitively coupled to that shield electrode portion 342', and their respective contributions to the response voltage arising on that shield electrode 342' will likewise be of equal and opposite polarity. Along a vertical direction at the left edge of that shield electrode 342', the 90 and 270 degree pair of transmitter signals on the capacitively coupled areas of the central "1" and outer "3" transmitter electrodes will similarly balance. Likewise, along a vertical direction at the right edge of that shield electrode 342', opposite-phase signals on the capacitively coupled areas of the central "3" and outer "1" transmitter electrodes will similarly balance.

Thus, similarly to the signal-balanced electrode configuration 200, for such a configuration of transmitter electrodes and signals, the operative shield electrode(s) of the signal-balanced shield electrode configuration 340 will be maintained at a DC voltage determined by the transmitter signals, which may be zero volts in various exemplary embodiments, at least at each time that the transducer provides a displacement measurement signal, and the shield electrode itself will not contribute to any erroneous voltage-related signal variations on the receiver electrodes. Accordingly, it will act as desired, that is, simply as a displacement-dependent screening or blocking element between the transmitter and receiver electrodes.

Also similarly to the signal-balanced electrode configuration 200, in operation, when the sinusoidal AC voltage signals having 0, 90, 180, and 270 degrees of temporal phase shift are applied to the interconnected electrodes numbered 0, 1, 2, and 3, respectively, the capacitive coupling along the capacitive coupling track 375 that is not effectively screened by the shield electrode portion(s) 342', for example, will give rise to a net sinusoidal AC voltage signal arising on the second receiver electrode portion 363 that will have a temporal phase that varies as an approximately linear function of the relative position of the shield electrode configuration 340 along the measuring axis/direction 80. Similarly, the capacitive coupling along the capacitive coupling tracks 374' and 374" that is not effectively screened by the shield electrode portion(s) 342', for example, will give rise to a net sinusoidal AC voltage signal arising on the electrically connected first receiver electrode portions 362A and 362B that has a temporal and spatial phase shift of 180 degrees, that is, one half of the wavelength P" along the measuring axis/direction 80, relative to that provided along the capacitive coupling track 375.

Thus, measurement signals of equal magnitude and opposite phase will generally be available at the second receiver electrode connection 263C and the first receiver electrode connection 262C, respectively. In various exemplary embodiments, these signals are input to the transducer electronic circuit 380 receiver electrode inputs R+ and R−, where they are sampled and input to a differential amplifier configuration which provides a measurement signal that is the amplified difference between the two signals, thus doubling the position measurement signal and removing various common mode errors that may be included in the receiver electrode signals. The differential measurement signal will have a temporal phase shift relative to a reference phase of signals input to the transmitters, that indicates the position of the shield electrode configuration 340 relative to the transmitter and receiver electrode configurations 320 and 360, within a particular current wavelength P'.

The exemplary embodiment of the signal-balanced electrode configuration 300 shown in FIGS. 6 and 7 is thus reliably operable according to the principles of this invention. The signal-balanced electrode configuration 300 may be conveniently and reliably operated with an electrically floating shield electrode 242, if desired. The specific embodiment of the signal-balanced electrode configuration 300 shown in FIGS. 6 and 7 provides a position signal having a temporal phase shift that varies approximately linearly as the shield electrode member 359 is displaced relative to the transmitter and receiver electrode members 339 and 379 along the measuring axis/direction 80. However, it should be appreciated that other electrode configuration variations that provide non-linear position signals are also operable in various embodiments according to this invention, although such embodiments may provide less resolution and accuracy, they may have cost advantages or other benefits in various specific applications. In any case, any one of a variety of known methods and circuits may be used for providing suitable transmitter signals and processing the resulting output signals to determine desired relative displacement values for such configurations.

In addition to a planar/linear configuration, the components shown in FIGS. 6 and 7 may alternatively be understood to represent parts of a cylindrical encoder, where the measuring axis/direction 80 is a cylindrical or circular measuring axis/direction and the shield electrode configuration 140 represents a segment of an element that continues to form a partial or complete cylindrical configuration along the measuring axis/direction 80, as previously described with reference to the signal-balanced electrode configuration 100. Thus, it will be understood that the configuration of the signal-balanced electrode configuration 300 disclosed above is illustrative only, and not limiting.

Figure 8:
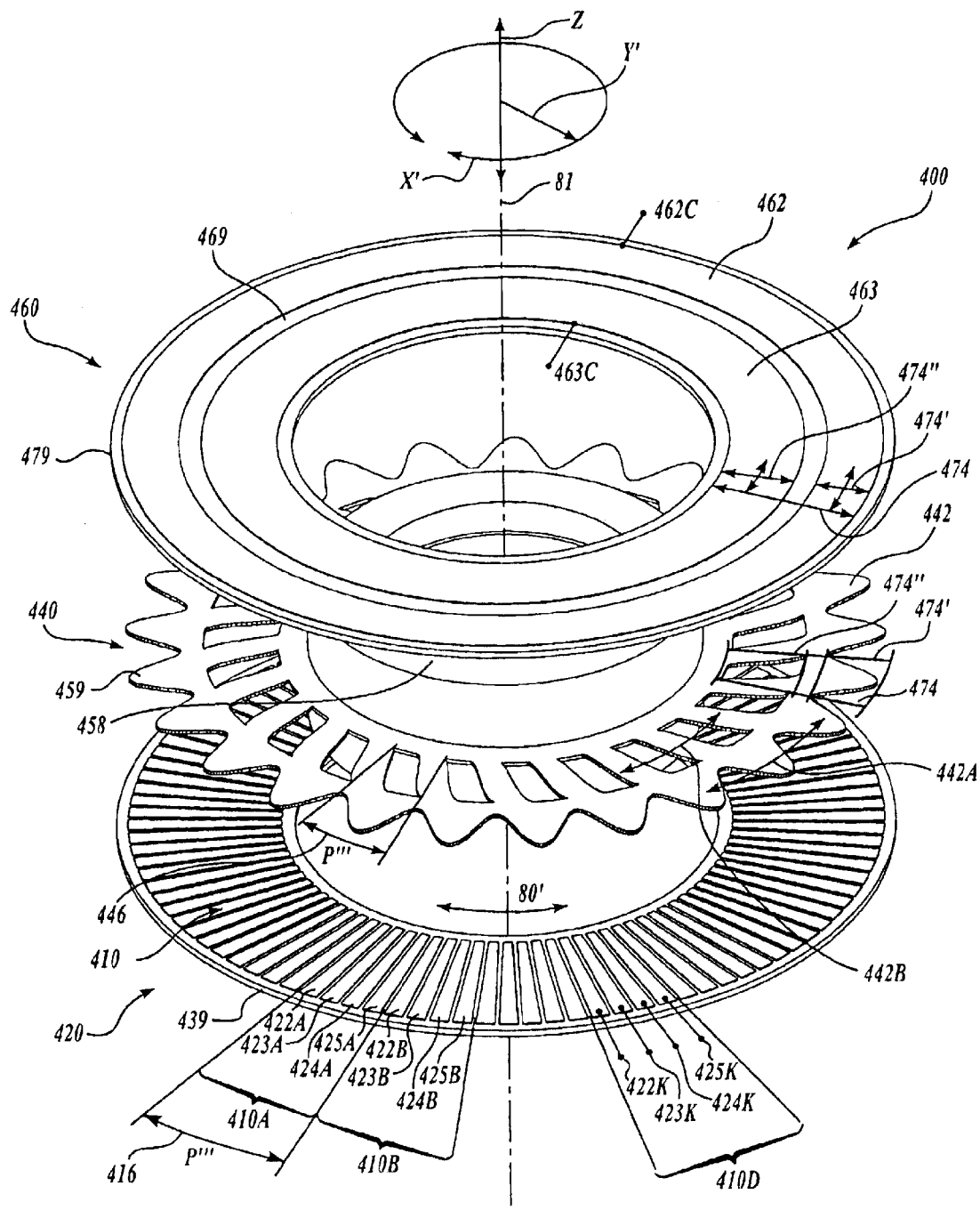
FIG. 8 is an exploded isometric view of a fourth exemplary embodiment of a signal-balanced electrode configuration according to this invention that is usable in a rotary capacitive encoder according to this invention.
Figure 9:
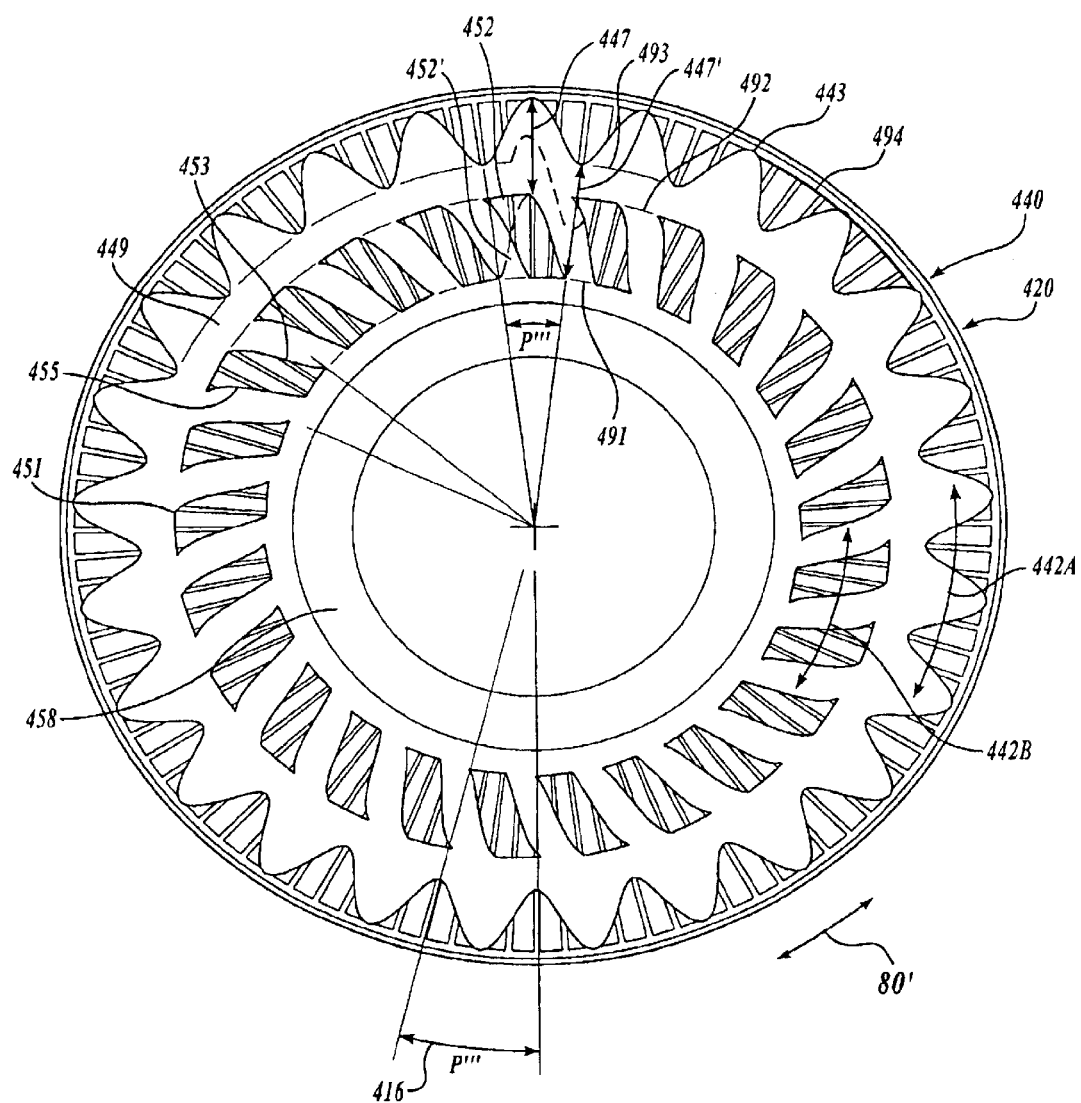
FIG. 9 is a plan view showing the alignment of the shield electrode configuration and the transmitter electrode configuration of FIG. 8, for the fourth exemplary embodiment of a signal-balanced electrode configuration according to this invention.

FIGS. 8 and 9 illustrate a fourth exemplary embodiment of a signal-balanced electrode configuration 400 according to this invention that is usable in a rotary or angular capacitive encoder according to this invention. FIG. 8 is an exploded view of the fourth exemplary embodiment 400, showing the receiver electrode configuration 460, the shield electrode configuration 440, and the transmitter electrode configuration 420. FIG. 9 is a plan view showing the operational alignment of the shield electrode configuration 440, and the transmitter electrode configuration 420, for the fourth exemplary embodiment of a signal-balanced electrode configuration 400 according to this invention.

The signal-balanced electrode configuration 400 has many elements and operating characteristics that are similar to those of the previously described signal-balanced electrode configuration 200, despite the fact that is a rotary configuration. Such similarities will be understood by one of ordinary skill in the art, thus, only significantly different elements and operating characteristics will be described in detail below. As shown in FIG. 8, the third exemplary embodiment of a signal-balanced electrode configuration 400 includes a transmitter electrode configuration 420 carried on a transmitter electrode member 439, a shield electrode configuration 440 carried on a shield electrode member 459, and a receiver electrode configuration 460 carried on a receiver electrode member 479.

The receiver electrode configuration 460 includes a circular receiver electrode member 479 that carries a circular first receiver electrode 462 and a circular second receiver electrode 463 that have schematically illustrated first and second receiver electrode connections 462C and 463C, respectively. For convenience of description, it is useful to define capacitive coupling tracks 474' and 474", which extend along the circular measuring direction 80 and are located along the radial Y'-direction to coincide with the span of the receiver electrodes 462 and 463, respectively, as shown in FIG. 8. The first and second receiver electrodes 462 and 463 are separated along the radial Y'-direction by the circular gap 469, and have respective spans widths along the radial Y'-direction such that they provide nominally equal capacitive coupling areas along the capacitive coupling tracks 474', 474", as will be described in greater detail below.

The shield electrode configuration 440 is carried on, or integral with, a shield electrode member 459 and includes a circular shield electrode 442. A mounting hub 458 may be provided and attached to, or integral with, the shield electrode member 459 in various exemplary embodiments. In any case the shield electrode member 459 and/or the mounting hub 458 is coupled to a rotating shaft that extends along a rotation axis 81 in various applications, such that the angular displacement of the rotating shaft is measured based on the angular displacement of the shield electrode configuration 440 relative to the remainder of the signal-balanced electrode configuration 400. The shield electrode 442 has a first portion that forms a first circular track 442A and a second portion that forms a second circular track 442B, which approximately coincide with the capacitive coupling tracks 474' and 474", respectively, and capacitively couple to the first and second receiver electrodes 462 and 463, respectively. Each of the first and second circular tracks 442A and 442B include a periodic pattern extending along the measuring axis/direction 80' that produces an approximately sinusoidal or quasi-sinusoidal capacitive coupling, as described further below with reference to FIG. 9. Each periodic pattern has an angular wavelength or pitch P''', which is also indicated by the dimension 446 in FIGS. 8 and 9. It should be appreciated that the design of the shield electrode configuration 440 is suitable for fabrication by etching or punching, or the like, from a single conductive sheet of material. Alternatively, it may be fabricated as a conductive pattern on a non-conductive printed circuit substrate (not shown).

In various exemplary embodiments, the various radial Y'-direction dimensions of the shield electrode configuration 440 are dimensioned relative to the various radial Y'-direction dimensions of the receiver electrode configuration 460 such that the centers of shield electrode configuration 440 and receiver electrode configuration 460 can be slightly misaligned and the various capacitive coupling areas between the shield electrode configuration 440 and the receiver electrode configuration 460 will tend to be relatively unchanged by the slight misalignment. For example, as best seen in FIG. 8, the peak-to-peak radial dimension of the pattern in the first circular track 442A is less than and nominally centered within the radial dimension of the first receiver electrode 462. The radial dimensions of the second circular track 442B and the second receiver electrode are similarly configured. In addition, the radial dimension of the transmitter electrodes of the transmitter electrode configuration 420 is sufficient to overlap all of the shield and receiver electrodes described electrodes despite similar misalignments. Thus, the signal-balanced electrode configuration 400, provides a particularly robust design with respect to preserving measurement accuracy despite various alignment errors during assembly and operation. By way of contrast, FIG. 9 shows an alternative embodiment of the shield electrode configuration 440 and the transmitter electrode configuration 420, where the radial dimensions of various electrodes are approximately the same. Such embodiments will be less accurate if the alignment is not sufficiently precise. However, such effects may be tolerable, or overcome by precise alignment in various applications, and such embodiments are within the scope of this invention.

The transmitter electrode configuration 420 should be understood to be essentially functionally and schematically similar to the previously described transmitter electrode configuration 220, except for the fact that is arranged in a rotary configuration having an angular wavelength or pitch P''' as described below. Such functional and schematic similarities will be understood by one of ordinary skill in the art, thus, only significantly different elements and operating characteristics will be described in detail below.

In the exemplary embodiment shown in FIGS. 8 and 9, the transmitter electrode configuration 420 is carried on transmitter electrode member 459, which may be an printed circuit board for example, carrying a plurality of transmitter electrode groups represented by the exemplary explicitly numbered transmitter electrode groups 410A, 410B and 410D, shown in FIG. 8. The first transmitter electrode group 410A has first, second, third and fourth transmitter electrodes 422A–225A, the second transmitter electrode group 410B has first, second, third and fourth transmitter electrodes 422B–225B, and so on along the circular axis direction of the transmitter electrode configuration 420 for other similar transmitter electrode groups. Each of the transmitter electrode groups have similar overall dimensions and are repeated periodically along the measuring axis/direction 80' according to a transmitter electrode group angular pitch 416 which is equal to the angular wavelength P'''.

There are an integer number of angular wavelengths P''' and, thus, an integer number of transmitter electrode groups 410 arranged around the circumference of the transmitter electrode configuration 420. Each of the transmitter electrodes 422X–425X have the same angular dimension along the measuring axis/direction 80' and conveniently may have the same radial Y'-direction dimension. Each of the transmitter electrodes 422X–425X may be fabricated on a printed circuit board with the "A" electrodes interconnected, the "B" electrodes interconnected, the "C" electrodes interconnected, and the "D" electrodes interconnected, approximately as previously described for the transmitter electrode configuration 220.

FIG. 9 shows the configuration and operational alignment of the shield electrode configuration 440 relative to the transmitter electrode configuration 420, as viewed along the direction of the rotational axis 81.

It should be appreciated that in order for the shield electrode configuration 440 to have a balanced signal according to the principles of this invention, the electrode area overlapped by each transmitter electrode must be the same. Unlike the linear transducer configurations, if each of the electrode boundaries 443, 453 and 455 were a purely sinusoidal function, due to the radial tapering of the transmitter electrodes the electrode area overlapped by various transmitter electrodes would vary. Thus, it is necessary to adjust the various shield electrode boundaries based on their nominal radial location.

One way of generating the required electrode boundaries is described as follows. It is convenient to define a "boundary generator" mid-line 445. In one exemplary embodiment, where there are N angular wavelengths P''' around the circumference of the shield electrode configuration 440, the radial coordinate of the generator midline 445 as a function of the angle α, in radians, along the measuring axis/direction 80', may be defined as follows:

$$M(\alpha) = M_{nom} + A_M \cos(N\alpha) \quad \text{(EQ. 1)}$$

where $M_{nom}$ is the nominal radial "reference" location of the generator midline 445.

In general, an incremental amount of overlapping area dA along measuring axis direction may be defined as approximately:

$$dA = span_r * r(\alpha) * d\alpha \quad \text{(EQ. 2)}$$

where r is the nominal radial location of the increment of area, span, is the length of the increment of area along the radial direction, and r*dα is the nominal dimension of the incremental area along the measuring axis direction at the nominal radial location.

Thus, in order for the electrode area overlapped by each transmitter electrode to be the same between the reference radii 491 ($r_1$) and 494 ($r_4$), the shield electrode radial span at each angle coordinate α must be adjusted for the nominal radial location of the span between the reference radii 491 ($r_1$) and 494 ($r_4$). That is, dA=α constant, therefore:

$$span_r(\alpha) = \frac{K}{r(\alpha)} \text{ or, when } r(\alpha) = M(\alpha), span_r(\alpha) = \frac{K}{M(\alpha)} \quad \text{(EQ. 3)}$$

According to this way of generating the shield electrode boundaries, along the radial coordinate direction the $span_r$ (α) is centered at the location M(α). The ends of the span define the required electrode boundaries. The relation of EQUATION 3 is exemplified by a relatively shorter radial span 447 at relatively larger nominal radial coordinate, and a relatively larger radial span 447' at relatively smaller nominal radial coordinate, in FIG. 9.

Equations 1–3 can be used to generate a wide variety of quasi-sinusoidal boundaries that provide a signal balanced shield electrode configuration along a circular measuring axis according to this invention. The constant K generally determines the radial spacing between the outer and inner electrode boundaries. In various exemplary embodiments, the constant K can be defined by an expression of the form $$K \approx C1 * M_{nom} + C2 \quad \text{(EQ. 4)}$$

where C1 and C2 are constants that provide a constant K that scales with the overall size of the shield electrode configuration. For example, for shield electrode configurations approximately as shown herein, C1≈2 and C2 is generally greater that zero, for example, approximately 1. However, this expression and these values are exemplary only, and not limiting. For any given embodiment, the constant K can be determined by analysis or trial and error, in order to provide the desired radial spacings.

As shown in FIG. 9, the pattern of the shield electrode first circular track 442A has a first shield electrode border 443 that meanders in a periodic fashion according to an approximately quasi-sinusoidal function having an angular wavelength P''' along the measuring axis/direction 80', between a maximum radial dimension $r_4$ corresponding to the reference line 494 and a minimum radial dimension $r_3$ corresponding to the reference line 493.

The pattern of the shield electrode second circular track 442B has individual openings 451, rather than continuous borders, in order that mechanical support for the first circular track 442A is provided by the material between the openings. The shape of the windows may be understood by considering the actual portion of the window opening delineated by a dashed line and marked with reference number 452, and a hypothetical portion of a hypothetical window opening delineated by a dashed line and marked with reference number 452', which have very similar approximately mirror image shapes.

It will be appreciated that if the hypothetical opening portion 452' were included in the openings, instead of the actual opening portion 452, the openings would have a border that follows a quasi-sinusoidal function of the angle α, having an angular wavelength P''', entirely as described above with reference to EQUATIONS 1–3. However, such a border would completely sever the shield electrode member at the reference radius 491. Thus, it should be appreciated that the actual opening portion 452A is formed as the functional equivalent of the quasi-sinusoidal hypothetical opening portion 452'.

This is accomplished as follows. Each opening 451 is bounded by four lines: a maximum radial dimension $r_2$ corresponding to the reference line 492; a minimum radial dimension $r_1$ corresponding to the reference line 491; a boundary line 453 generated according to EQUATIONS 1–3, and a boundary line 455 what is identical to the boundary line 453 but offset along the measuring axis/direction 80' by one half of the period P'''.

The foregoing method of generating a shield electrode provides a quasi-sinusoidal capacitive coupling variation, that is, shielded area variation, between the various transmitter and receiver electrodes as a function of rotational displacement. A more ideal sinusoidal capacitive coupling variation, that is, shielded area variation, between the various transmitter and receiver electrodes as a function of rotational displacement may be provided by shield electrode boundaries determined as follows. With reference to the previously described radial dimensions $r_1$ through $r_4$, the radial coordinate of the first shield electrode border 443 may be defined by the expression:

$$r'(\alpha) = \sqrt{r_3^2 + \frac{1}{2}(r_4^2 - r_3^2)*(1+\cos N\alpha)} \quad \text{(EQ. 5)}$$

Similarly, the radial coordinate of the boundary line 453 may be defined by the expression:

$$r''(\alpha) = \sqrt{r_1^2 + \frac{1}{2}(r_2^2 - r_1^2)*(1+\cos N\alpha)} \quad \text{(EQ. 6)}$$

Similar to the description above, opening 451 is the bounded by four lines: a maximum radial dimension $r_2$ corresponding to the reference line 492; a minimum radial dimension $r_1$ corresponding to the reference line 491; a boundary line 453 generated according to EQUATION 6, and a boundary line 455 what is identical to the boundary line 453 but offset along the measuring axis/direction 80' by one half of the period P'''. The receiver electrodes 462 and 463 will provide signals having approximately equal amplitudes when the radial dimensions $r_1$ through $r_4$ are chosen such that the receiver electrodes 462 and 463 have equal areas.

It should be appreciated that as a result of the patterning methods outlined above, for any angle α, the exemplary embodiment of the shield configuration 440 shown in FIGS. 8 and 9 provides a constant capacitive coupling area to each transmitter electrode at each location around its circumference, in order to provide a signal-balanced shield electrode configuration 440 according to this invention.

In operation, the transmitter electrodes 422X–425X maybe supplied with input signals through the connections 422K–425K, in the same manner previously described for the signals input through the corresponding connections 222K–225K of the signal-balanced electrode configuration 200. Thus, similarly to the previously described signal-balanced electrode configuration 200, for such a configuration of transmitter electrodes and signals, the operative shield electrode(s) of the signal-balanced shield electrode configuration 440 will be maintained at a DC voltage determined by the transmitter signals, which may be zero volts in various exemplary embodiments, at least at each time that the transducer provides a displacement measurement signal, and the shield electrode itself will not contribute to any erroneous voltage-related signal variations on the receiver electrodes. Accordingly, it will act as desired, that is, simply as a displacement-dependent screening or blocking element between the transmitter and receiver electrodes.

The exemplary embodiment of the signal-balanced electrode configuration 400 shown in FIGS. 8 and 9 is thus reliably operable according to the principles of this invention. The signal-balanced electrode configuration 400 may be conveniently and reliably operated with an electrically floating shield electrode 442, if desired. The specific embodiments of the signal-balanced electrode configuration 400 described above and shown in FIGS. 8 and 9 provide an angular position signal having a temporal phase shift that varies approximately linearly as the shield electrode member 459 is rotationally displaced relative to the transmitter and receiver electrode members 439 and 479 along the measuring axis/direction 80'. However, it should be appreciated that other electrode configuration variations that provide non-linear position signals are also operable in various embodiments according to this invention, although such embodiments may provide less resolution and accuracy, they may have cost advantages or other benefits in various specific applications. In any case, any one of a variety of known methods and circuits may be used for providing suitable transmitter signals and processing the resulting output signals to determine desired relative displacement values for such configurations.

It should be appreciated that according to the embodiment described above, the signals output on the receiver electrode connections 462C and 463C may be input to a differential signal processing circuit, to provide a position or displacement measurement as previously described herein. According to the shield electrode boundary determining method outlined above, because $span_r(\alpha)$ is centered at the location $M(\alpha)$, it will be found that when the receiver electrode boundary radii are chosen to approximately correspond to the inner and outer peaks of the respective shield electrode boundaries, then the signals output on the receiver electrode connections 462C and 463C will be of equal magnitude and oppositite phase, which is advantageous for simplifying signal processing and removing certain common mode errors, in the same manner as previously described for the signals output on the receiver electrode connections 262C and 263C of the signal-balanced electrode configuration 200.

Figure 10:
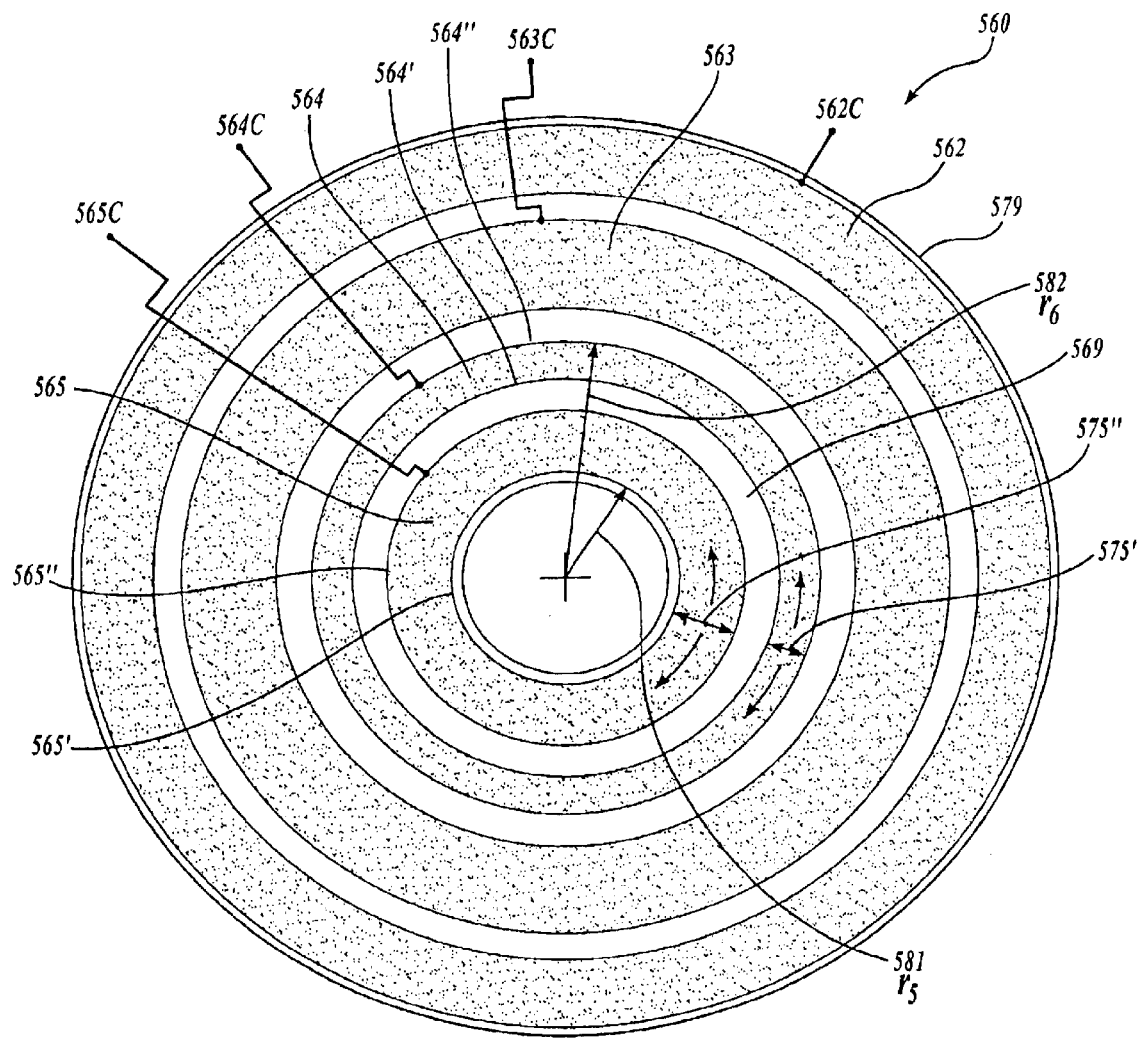
FIG. 10 is a plan view of a receiver electrode configuration usable in a fifth exemplary embodiment of a signal-balanced electrode configuration according to this invention that is usable in an absolute rotary capacitive encoder according to this invention.
Figure 11:
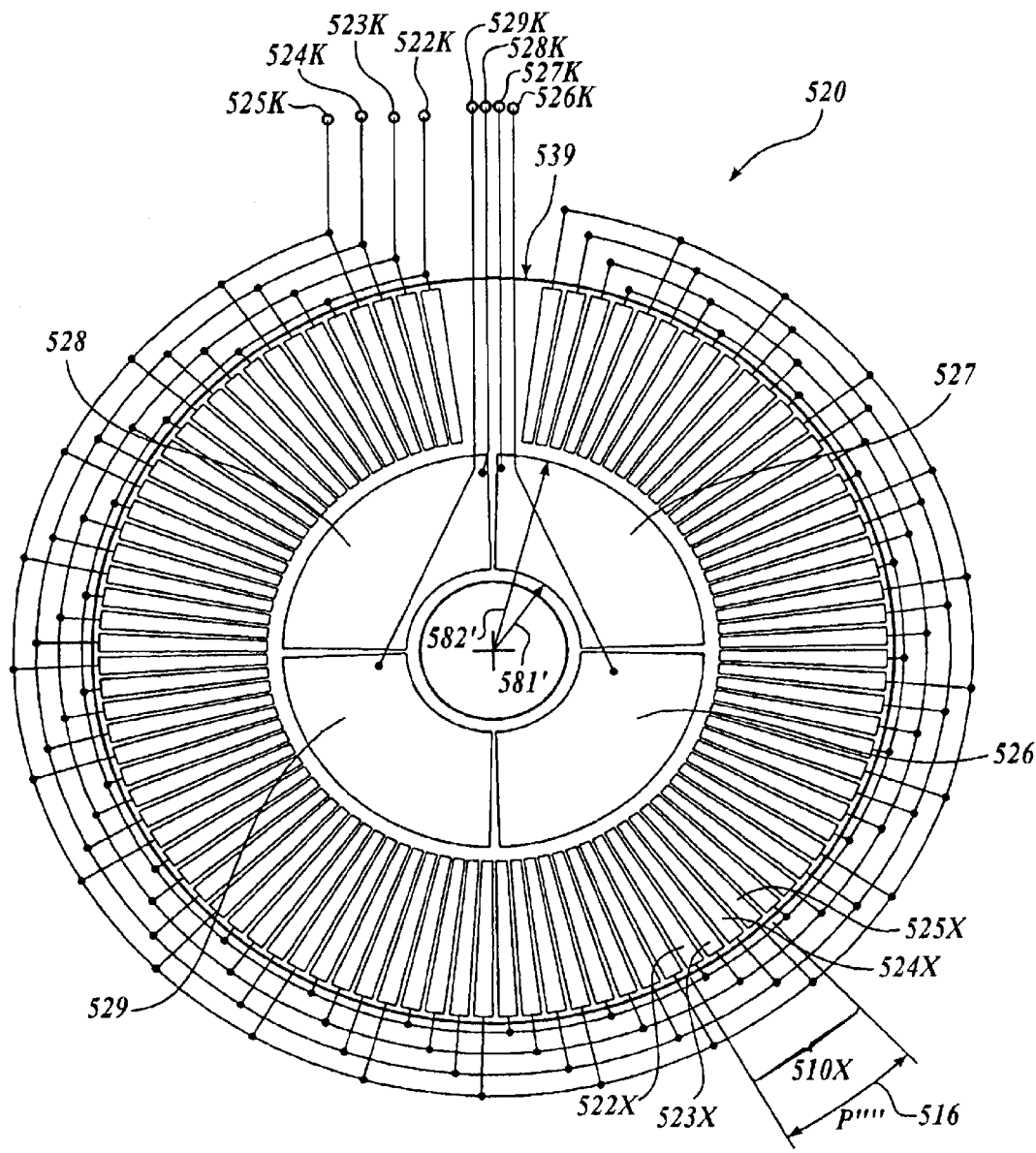
FIG. 11 is a plan view of a transmitter electrode configuration usable in the fifth exemplary embodiment of a signal-balanced electrode configuration according to this invention.
Figure 12:
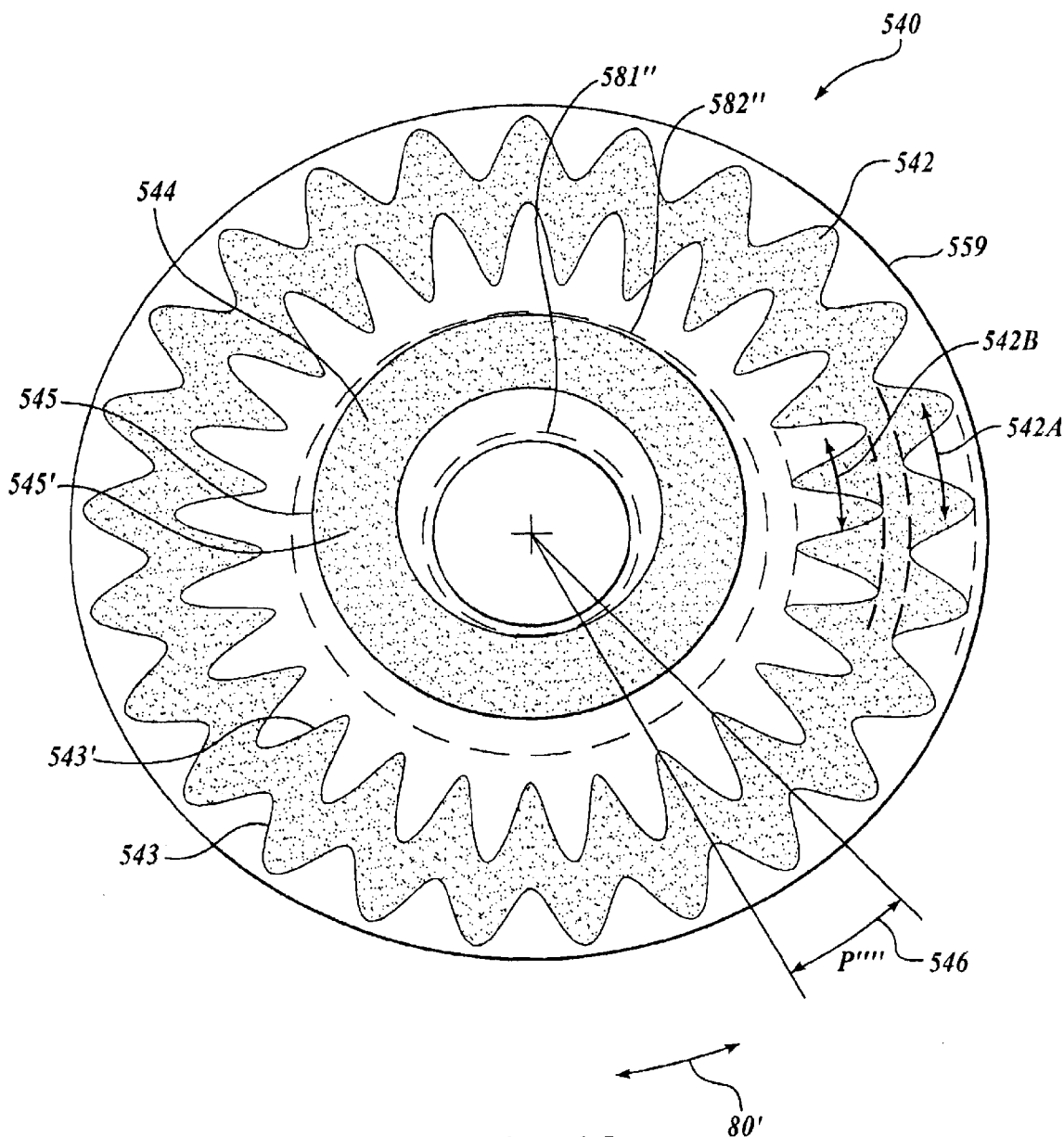
FIG. 12 is a plan view of a shield electrode configuration usable in the fifth exemplary embodiment of a signal-balanced electrode configuration according to this invention.
Figure 13:
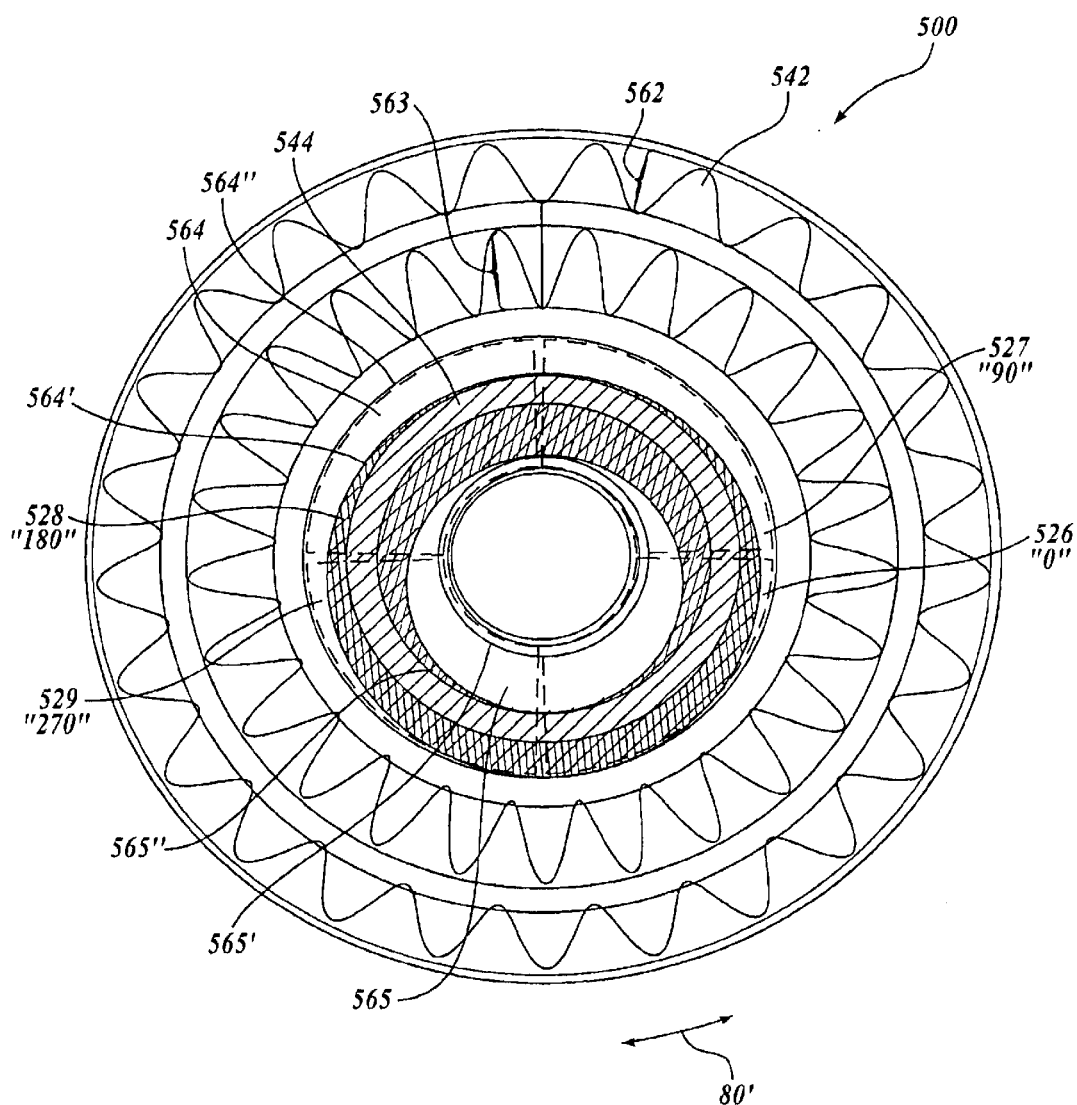
FIG. 13 is a plan view showing the alignment of the receiver electrode configuration of FIG. 10, the shield electrode configuration of FIG. 11, and the central electrodes of the transmitter electrode configuration of FIG. 12, for the fifth exemplary embodiment of a signal-balanced electrode configuration according to this invention that is usable in an absolute rotary capacitive encoder according to this invention.

FIGS. 10–13 illustrate a fifth exemplary embodiment of a signal-balanced electrode configuration 500 according to this invention that is usable to provide absolute angular position measurement in a rotary or angular capacitive encoder according to this invention. FIG. 10 is a plan view of a receiver electrode configuration 560, FIG. 11 is a plan view of a transmitter electrode configuration 520, and FIG. 12 is a plan view of a shield electrode configuration 540, all usable in the signal-balanced electrode configuration 500. FIG. 13 is a plan view showing the operation alignment of the receiver electrode configuration 560, the shield electrode configuration 540, and the central electrodes of the transmitter electrode configuration 520. Certain transmitter electrodes and connections, and the like, are omitted in FIG. 13, to avoid visual clutter and provide greater clarity for certain aspects of the operation of the signal-balanced electrode configuration 500.

The signal-balanced electrode configuration 500 has many elements and operating characteristics that are similar to those of the previously described signal-balanced electrode configuration 400. In general, correspondingly number elements are designed and operate similarly. For example, the element 562 corresponds to the previously described element 462, and so on. Such similarities will be understood by one of ordinary skill in the art, thus, only significantly different elements and operating characteristics will be described in detail below.

As shown in FIG. 10, the receiver electrode configuration 560 includes a circular receiver electrode member 579 that carries a circular first receiver electrode 562 and a circular second receiver electrode 563 that have schematically illustrated first and second receiver electrode connections 562C and 563C, respectively, all of which may be designed and operated in the same manner as previously described for the corresponding elements of the receiver electrode configuration 560. For example, in one exemplary embodiment, the radial dimensions and locations of the receiver electrodes 562 and 563 can be identical to those previously described for the receiver electrode configuration 460.

In addition, the receiver electrode configuration 560 includes a circular third receiver electrode 564 having in inner border 564' and an outer border 564", and a circular fourth receiver electrode 565 having in inner border 565' and an outer border 565", that have schematically illustrated third and fourth receiver electrode connections 564C and 565C, respectively. For convenience of description, it is useful to define capacitive coupling tracks 575' and 575", which extend along the circular measuring axis/direction 80' and are located along the radial Y'-direction to coincide with the span of the receiver electrodes 564 and 565, respectively, as shown in FIG. 10. It is convenient to define the outer radius of the capacitive coupling track 575', indicated by the dimension line 582, as $r_6$ and the inner radius of the capacitive coupling track 575", indicated by the dimension line 581, as $r_5$. The third and fourth receiver electrodes 564 and 565 are separated along the radial Y'-direction by the circular gap 569, and have respective spans widths along the radial Y'-direction such that they provide nominally equal capacitive coupling areas along the capacitive coupling tracks 575', 575", as will be described in greater detail below.

As shown in FIG. 11, the exemplary transmitter electrode configuration 520 is carried on a transmitter electrode member 539, which may be an printed circuit board for example, carrying a plurality of transmitter electrode groups 510 represented by the exemplary generically numbered transmitter electrode group 510X. Each of the transmitter electrode groups have similar overall dimensions and are repeated periodically along the measuring axis/direction 80' according to a transmitter electrode group angular pitch 516 which is equal to the angular wavelength P" ". Each transmitter electrode group 510X has first, second, third and fourth transmitter electrodes 522X–525X. There are nominally an integer number of angular wavelengths P" " and, thus, an integer number of transmitter electrode groups 510 arranged around the circumference of the transmitter electrode configuration 520. However, in the exemplary embodiment shown in FIG. 11, one such transmitter electrode group 510 is omitted, to make room for the connections 526K–529K to the central transmitter electrodes 526–529, described in greater detail below.

It should be understood that the plurality of transmitter electrode groups 510 may be designed and operated in the same manner as previously described for the transmitter electrode groups 410 of the transmitter electrode configuration 420. For example, in one exemplary embodiment, the radial dimensions and locations of the transmitter electrodes of the transmitter electrode groups 510 can be identical to those previously described for the transmitter electrode configuration 420. The interconnections between the various electrodes of the transmitter electrode groups 510 and their input signal connections 522K–525K are schematically illustrated in FIG. 11.

With regard to the central transmitter electrodes 526–529, they are conveniently described as coinciding with quadrants of a circular capacitive coupling track that has an inner radius indicated by the dimension line 581', which may be equal to the receiver electrode inner radius $r_5$ in various exemplary embodiments, and that has an outer radius indicated by the dimension line 582', which may be equal to the receiver electrode outer radius $r_6$ in various exemplary embodiments. In operation, sinusoidal AC voltage signals having 0, 90, 180, and 270 degrees of temporal phase shift are applied to the central transmitter electrodes 526–529, respectively, through the schematically-shown connections 526K–529K, respectively. Accordingly, it should be appreciated that with such signals applied to the central transmitter electrodes 526–529, the central transmitter electrodes 526–529 define a second angular wavelength Q corresponding to one rotation about the transmitter electrode configuration 520, that is, Q=2π radians.

As shown in FIG. 12, The shield electrode configuration 540 is carried on a shield electrode member 559 and includes a first shield electrode 542 that meanders in a periodic fashion along the circular measuring axis/direction 80' and an approximately circular, but eccentrically located, second or central shield electrode 544. The shield electrode member 559 is a nonconductive printed circuit substrate in various exemplary embodiments. The first shield electrode 542 has a first portion that forms a first circular track 542A and a second portion that forms a second circular track 542B, which approximately coincide with, and capacitively couple to, the first and second receiver electrodes 562 and 563, respectively. Each of the first and second circular tracks 542A and 542B include a periodic pattern extending along the measuring axis/direction 80' that produces an approximately sinusoidal capacitive coupling to the first and second receiver electrodes 562 and 563, respectively. Each periodic pattern has an angular wavelength or pitch P" ", which is also indicated by the dimension 546 in FIGS. 12 and 13. The pattern of the shield electrode first circular track 542A has a first shield electrode border 543 that meanders periodically along the measuring axis/direction 80' according to a quasi-sinusoidal function having an angular wavelength P" ". In one exemplary embodiment, the radial location and quasi-sinusoidal path of the first shield electrode border 543 are identical to those of the previously described shield electrode border 443 of the shield electrode configuration 440, and may be determined according to EQUATION 5, for example. The pattern of the shield electrode second circular track 542B is not required to have individual openings like those of the shield electrode configuration 440 due to the mechanical support that the nonconductive substrate of the shield electrode member 559 provides for all shield electrode tracks. Rather, a second shield electrode border 543', similar to the first shield electrode border 543, also meanders periodically along the measuring axis/direction 80' according to a quasi-sinusoidal function having an angular wavelength P" ", and in embodiments where the first shield electrode border 543 is determined as described above according to EQUATION 5, the second shield electrode border 543' is determined according to EQUATION 6. In various other exemplary embodiments, the boundaries 543 and 543' are each generated according to the teachings described above with reference to EQUATIONS 1–3.

Similar to the shield electrode configuration 440, as a result of the patterning described above, for any angle α, the exemplary embodiment of the first shield electrode 542 of the shield electrode configuration 540 shown in FIG. 12 provides a constant capacitive coupling area to each transmitter electrode at each location around its circumference, in order to provide a signal-balanced first shield electrode 542 according to this invention.

In operation, the transmitter electrodes 522X–525X maybe supplied with input signals through the connections 522K–525K, in the same manner previously described for the signals input through the corresponding connections 422K–425K of the signal-balanced electrode configuration 400. Thus, similarly to the previously described signal-balanced electrode configuration 400, for such a configuration of transmitter electrodes and signals, the operative shield electrode(s) of the signal-balanced first shield electrode 542 will be maintained at a DC voltage determined by the transmitter signals, which may be zero volts in various exemplary embodiments, at least at each time that the transducer provides a displacement measurement signal, and the shield electrode itself will not contribute to any erroneous voltage-related signal variations on the receiver electrodes. Accordingly, it will act as desired, that is, simply as a displacement-dependent screening or blocking element between the transmitter and receiver electrodes.

The exemplary embodiment of the signal-balanced first shield electrode 542 shown in FIGS. 12 and 13 is thus reliably operable according to the principles of this invention. The signal-balanced electrode configuration 500 may be conveniently and reliably operated with an electrically floating first shield electrode 542, if desired. The specific embodiment of the signal-balanced electrode configuration 500 described above and shown in FIGS. 10–13 provides an angular position signal having a temporal phase shift that varies approximately linearly as the shield electrode member 559 is rotationally displaced relative to the transmitter and receiver electrode members 539 and 579 along the measuring axis/direction 80'. However, it should be appreciated that other electrode configuration variations that provide non-linear position signals are also operable in various embodiments according to this invention, although such embodiments may provide less resolution and accuracy, they may have cost advantages or other benefits in various specific applications. In any case, any one of a variety of known methods and circuits may be used for providing suitable transmitter signals and processing the resulting output signals to determine desired relative displacement values for such configurations.

It should be appreciated that according the embodiment described above, the signals output on the receiver electrode connections 562C and 563C may be input to a differential signal processing circuit, to provide a position or displacement measurement as previously described herein. According to the embodiment described above, when the receiver electrode boundary radii are chosen such that the receiver electrodes 562 and 563 have equal areas, then the signals output on the receiver electrode connections 562C and 563C will be of equal magnitude and oppositite phase, which is advantageous for simplifying signal processing and removing certain common mode errors, in the same manner as previously described for the signals output on the receiver electrode connections 262C and 263C of the signal-balanced electrode configuration 200.

With regard to the central shield electrode 544, it appears as an approximately circular electrode, eccentrically located within the previously described circular capacitive coupling track that has an inner radius indicated by the dimension line 581', and that has an outer radius indicated by the dimension line 582', described with reference to FIG. 10. In various exemplary embodiments, the approximately circular central shield electrode 544 has inner and outer boundaries, 545' and 545 respectively, determined according to the teachings previously described with reference to EQUATIONS 1–3 or, alternatively, with reference to EQUATIONS 5 and 6. Because there is only one period "Q"0 of the central shield electrode 544 around $2\pi$ radians (N=1), described further below, the resulting quasi-sinusoidal boundaries 545 and 545' appear approximately as eccentric circles, with respectively different center locations.

In various exemplary embodiments, better tolerance for various misalignments is provided if the maximum radial extent of the central shield electrode 544 indicated by the dimension line 582", is slightly less than the radial dimensions 582' and 582, shown in FIGS. 11 and 10, respectively. Similarly, it is advantageous if the minimum radial extent of the central shield electrode 544 indicated by the dimension line 581", is slightly greater than the radial dimensions 581' and 581, shown in FIGS. 11 and 10, respectively.

In operation, sinusoidal AC voltage signals having 0, 90, 180, and 270 degrees of temporal phase shift are applied to the central transmitter electrodes 526–529, respectively, through the schematically-shown connections 526K–529K, respectively, as best shown in FIG. 11. Accordingly, it should be appreciated that with such signals applied to the central transmitter electrodes 526–529, the central transmitter electrodes 526–529 define a second angular wavelength Q corresponding to one rotation about the transmitter electrode configuration 520, that is, Q=$2\pi$ radians.

As best shown in FIG. 13, the central shield electrode 544 always fully overlaps each of the transmitter electrodes 526–529. Thus, for such a configuration of transmitter electrodes and signals, the operative shield electrode(s) of the central shield electrode 544 with boundaries determined as previously outline, will be maintained at a DC voltage determined by the transmitter signals, which may be zero volts in various exemplary embodiments, at least at each time that the transducer provides a displacement measurement signal, and the central shield electrode 544 will not contribute to any erroneous voltage-related signal variations on the receiver electrodes. Accordingly, it will act as desired, that is, simply as a displacement-dependent screening or blocking element between the transmitter and receiver electrodes.

Furthermore, similarly to the previously described multi-period first shield electrode 542, the single-period central shield electrode 544 provides an angular position signal having a temporal phase shift that varies nearly linearly as the shield electrode member 559 is rotationally displaced relative to the transmitter and receiver electrode members 539 and 579 along the measuring axis/direction 80'. For example, is indicated by the high-density cross-hatching shown in FIG. 13, for the relative position shown in FIG. 13, the central shield electrode 544 is shielding strongly in the vicinity between the receiver electrode 564 and the transmitter electrodes 526 and 529. Therefore, the signals from the transmitter electrodes 527 and 528 will predominate on the receiver electrode 564, to produce a signal having a relative phase shift of approximately 135 degrees on the receiver electrode 564. In an analogous manner, the signals for the transmitter electrodes 526 and 529 will predominate on the receiver electrode 565, to produce a signal having a relative phase shift of approximately 315 degrees on the receiver electrode 565.

It should be appreciated that according to the embodiment described above, the signals output on the receiver electrode connections 562C and 563C may be input to a differential signal processing circuit, to provide a position or displacement measurement as previously described herein. In addition, if the boundaries of the central shield electrode 542 are determined as previously described, and the receiver electrode boundary radii are chosen such that the receiver electrodes 564 and 565 have equal areas, then the signals output on the receiver electrode connections 562C and 563C will be of equal magnitude and oppositite phase, which is advantageous for simplifying signal processing and removing certain common mode errors, in the same manner as previously described for the signals output on the receiver electrode connections 462C and 463C of the signal-balanced electrode configuration 400.

It should be appreciated that the angular position signal resulting from the operation of the capacitive coupling tracks corresponding to the receiver electrodes 461 and 463 provides a unique signal value at each angular position around one full rotation of the shield electrode member 559 relative to the transmitter and receiver electrode members 539 and 579. This everywhere unique or "absolute" coarse position signal can be analyzed or "interpolated" to identify an "absolute" angle that corresponds to a particular one of the finer resolution periods corresponding to the capacitive coupling tracks 542A and 542B, corresponding to the first shield electrode 542 and the receiver electrodes 562 and 563. The nearly linear angular position signal resulting from the operation of the capacitive coupling tracks 542A and 542B can then be analyzed or "interpolated" to refine the absolute angle measurement provided the signal-balanced electrode configuration 500. The signal-balanced electrode configuration 500 thus provides a high-resolution absolute angular measurement capability around a full rotation of the transducer.

Figure 14:
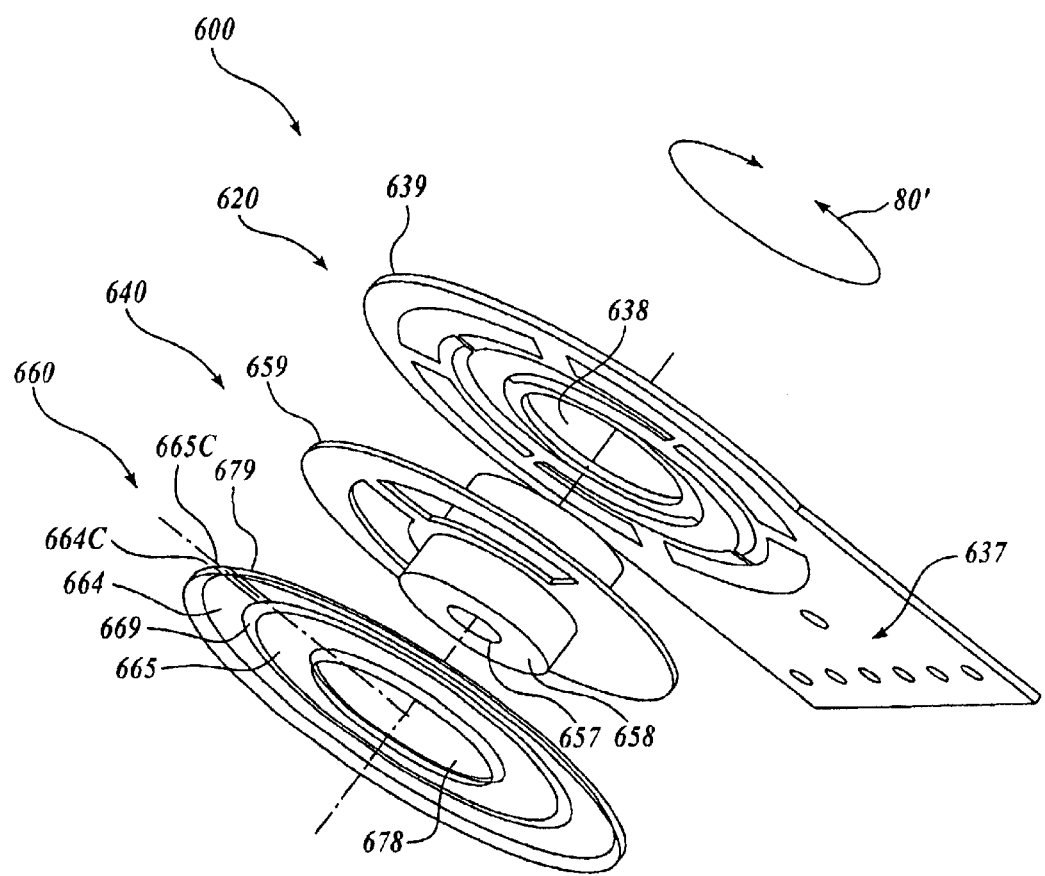
FIG. 14 is an exploded isometric view of a sixth exemplary embodiment of a signal-balanced electrode configuration according to this invention that is usable in a rotary capacitive encoder according to this invention.
Figure 15:
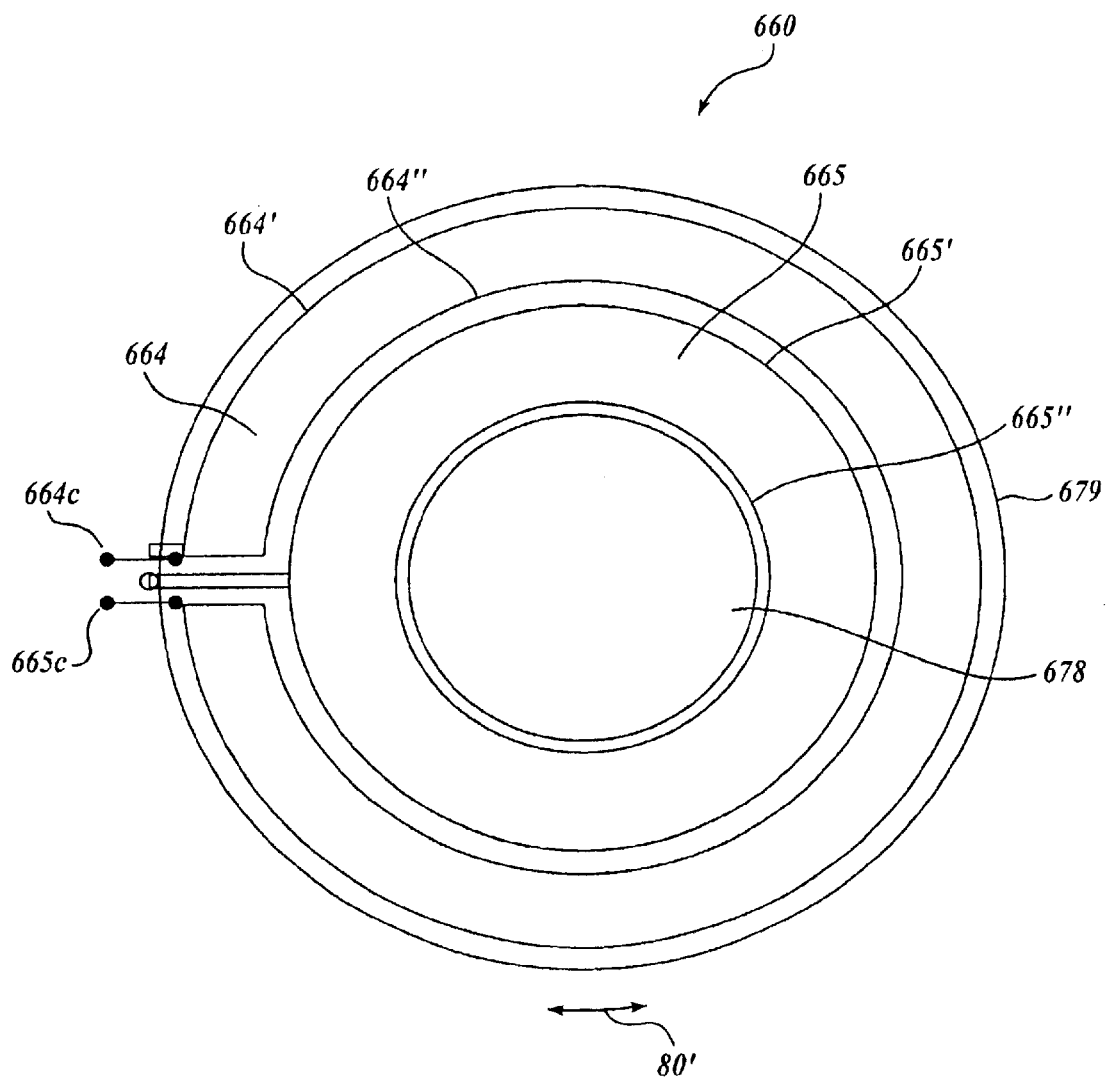
FIG. 15 is a plan view showing the receiver electrode configuration of FIG. 14, for the sixth exemplary embodiment of a signal-balanced electrode configuration according to this invention.
Figure 16:
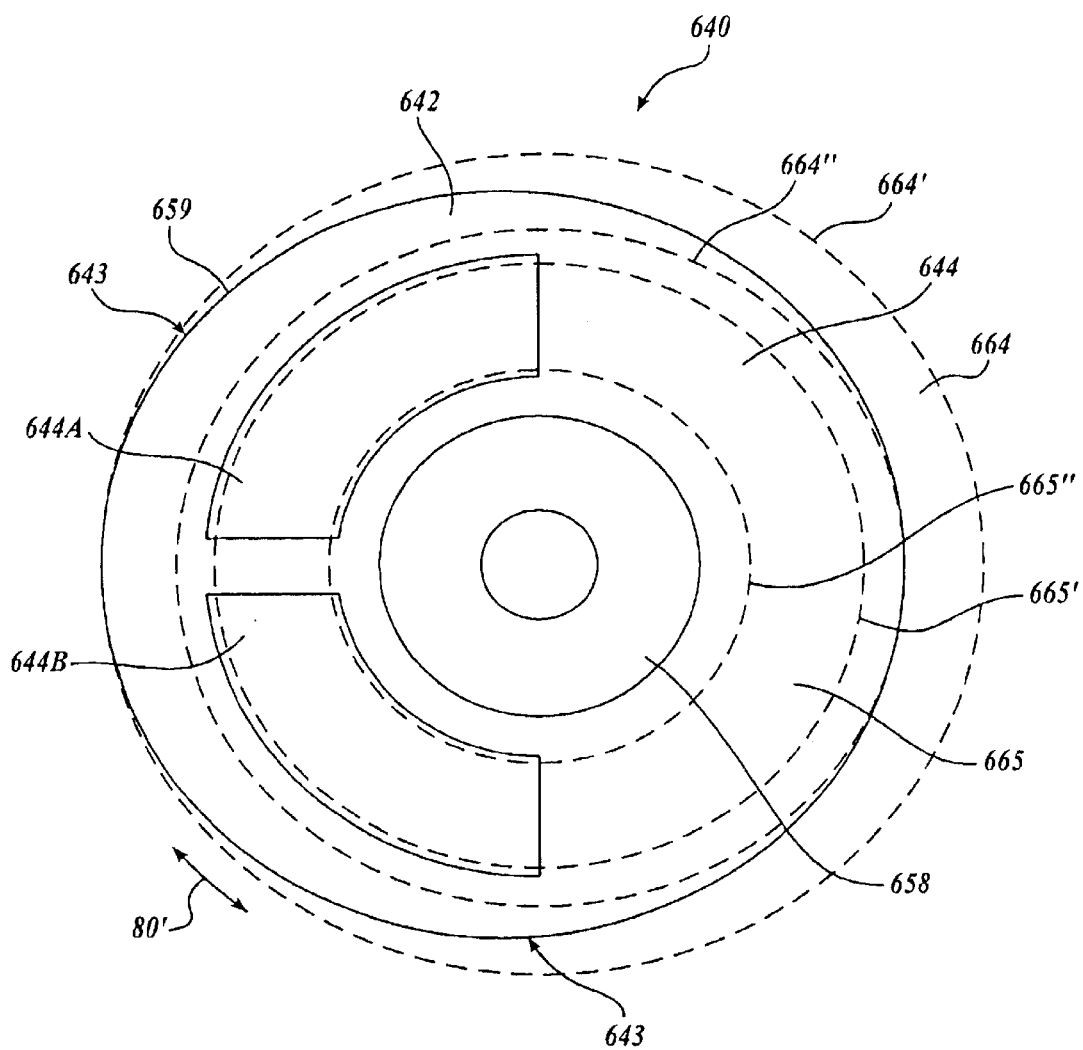
FIG. 16 is a plan view showing the shield electrode configuration of FIG. 14, and its alignment with the receiver electrode configuration of FIG. 15, for the sixth exemplary embodiment of a signal-balanced electrode configuration according to this invention.
Figure 17:
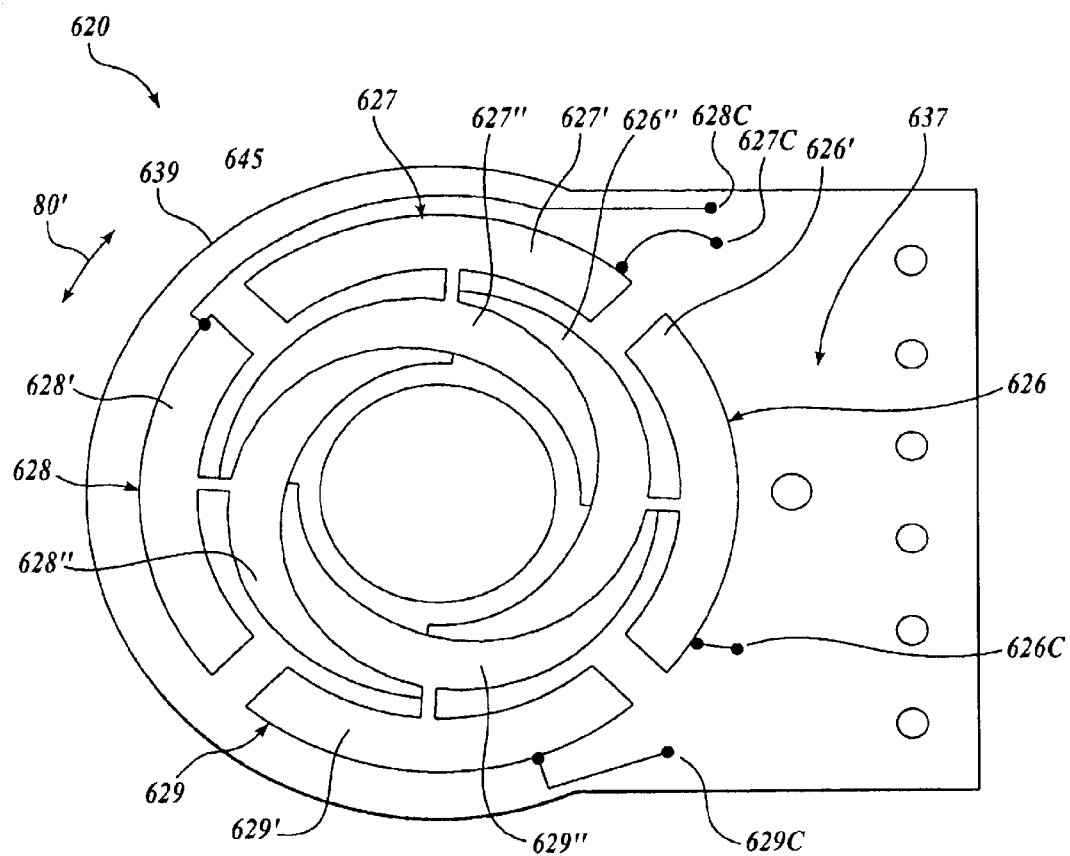
FIG. 17 is a plan view showing the transmitter electrode configuration of FIG. 14, for the sixth exemplary embodiment of a signal-balanced electrode configuration according to this invention.
Figure 18:
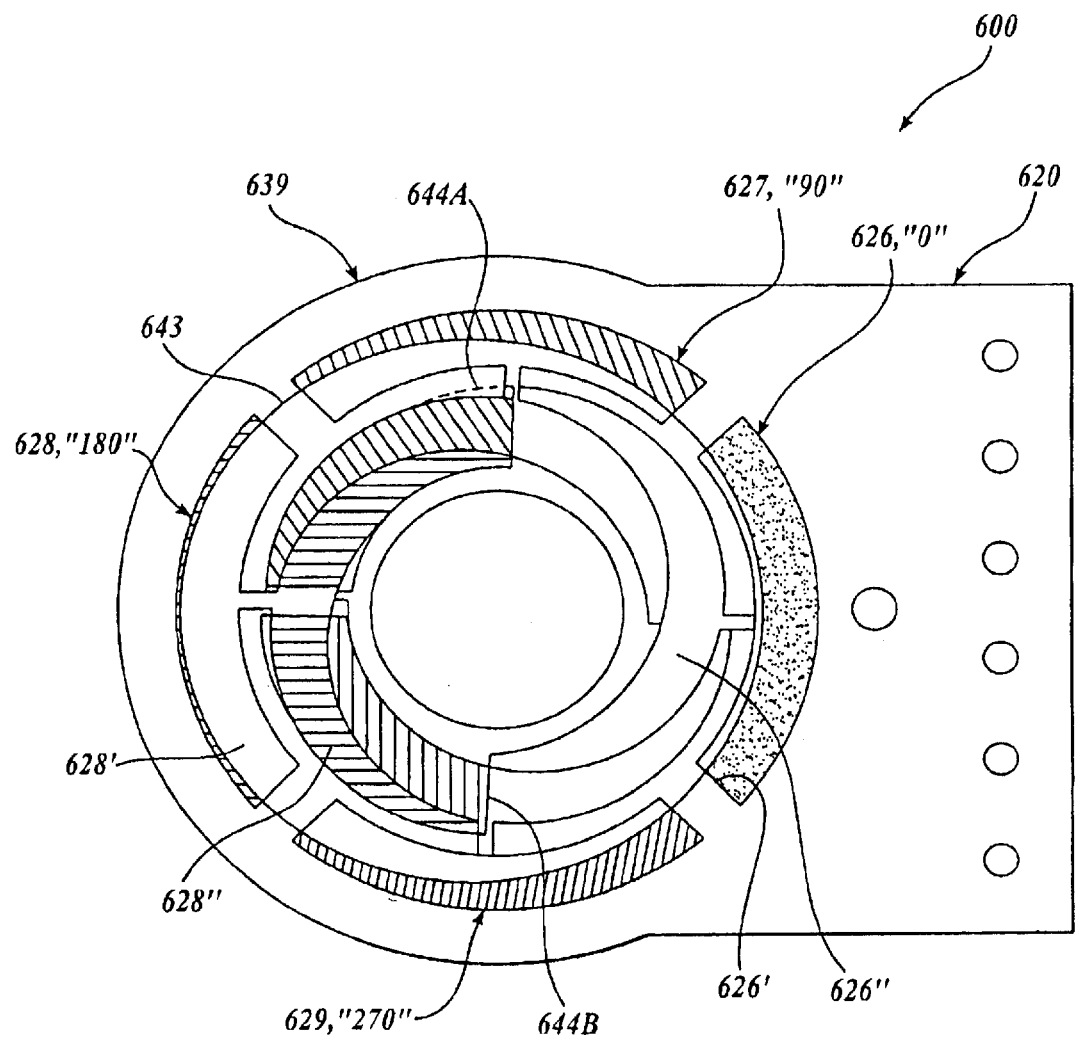
FIG. 18 is a plan view showing the alignment of the transmitter electrode configuration of FIG. 17, the shield electrode configuration of FIG. 16, and areas where the transmitter electrode configuration is capacitively coupled to the receiver electrode configuration of FIG. 15, for the sixth exemplary embodiment of a signal-balanced electrode configuration according to this invention.

FIGS. 14–18 illustrate a sixth exemplary embodiment of a signal-balanced electrode configuration 600 according to this invention that is usable to provide absolute angular position measurement in a rotary or angular capacitive encoder according to this invention over one full rotation of $2\pi$ radians. FIG. 14 is an exploded isometric view of the sixth exemplary embodiment of the signal-balanced electrode configuration 600. FIG. 15 is a plan view showing the receiver electrode configuration 660 of FIG. 14, FIG. 16 is a plan view showing the shield electrode configuration 640 of FIG. 14 and its alignment with the receiver electrode tracks of FIG. 15, FIG. 17 is a plan view showing the transmitter electrode configuration 620 of FIG. 14, and FIG. 18 is a plan view showing the alignment of the transmitter electrode configuration 620, the shield electrode configuration 640, and areas where the transmitter electrode configuration 620 is capacitively coupled to the receiver electrode configuration 660, for the sixth exemplary embodiment of a signal-balanced electrode configuration 600.

The signal-balanced electrode configuration 600 has some elements and operating characteristics that are similar to those of the centrally located single-period portions of the previously described signal-balanced electrode configuration 500. In general, correspondingly number elements are designed and operate similarly. Such similarities will be understood by one of ordinary skill in the art, thus, only significantly different elements and operating characteristics will be described in detail below.

As shown in FIG. 14, the receiver electrode configuration 660 includes a circular receiver electrode member 679 (shown in transparent outline form) that has a central hole 678 and that carries a circular first receiver electrode 664 and a circular second receiver electrode 665 that have schematically illustrated first and second receiver electrode connections 664C and 665C, respectively. The first and second receiver electrodes 664 and 665 are separated by a circular gap 669 and may be designed and operated approximately as previously described for the corresponding elements 564 and 565 of the receiver electrode configuration 560. As best seen in FIG. 15, the receiver electrode 664 has in inner border 664' and an outer border 664", and the receiver electrode 665 has in inner border 665' and an outer border 665", respectively. When the radial dimensions of the receiver electrodes 664 and 665 are dimensioned such that the receiver electrodes 664 and 665 have equal capacitive coupling areas and the transmitter and shield electrodes are designed as described below, the signals provided by the receiver electrodes 664 and 665 will have approximately equal amplitudes.

As shown in FIG. 14, the exemplary transmitter electrode configuration 620 is carried on a transmitter electrode member 639 that has a central hole 638, and which may be a printed circuit board, for example, that may include an area 637 for carrying circuitry for driving various transmitter electrode connections and receiving signals from the receiver electrode connections 664C and 665C in various exemplary embodiments. The transmitter electrode configuration 620 is described in greater detail below. The exemplary shield electrode configuration 640 includes a shield electrode member 659 and a mounting hub 658 that passes with clearance through the central holes 678 and 638 when the signal-balanced electrode configuration 600 is operationally aligned and assembled. A through hole 657 receives an external shaft that supports and rotates the shield electrode member 659 relative to the receiver and transmitter electrode members 679 and 639 during operation.

FIG. 16 shows the shield electrode configuration 640 and its operational alignment relative to the position of the receiver electrodes 664 and 665, which are shown in dashed outline. In various exemplary embodiments, the shield electrode configuration 640 is provided integrally with the conductive shield electrode member 659, which may be punched or etched to provide the desired electrode shape, in various exemplary embodiments. The shield electrode configuration 640 includes an outer electrode portion 642 overlaps with the receiver electrode 664 and an inner electrode portion 644 that overlaps with the receiver electrode 665. In one exemplary embodiment, a boundary 643 of the outer electrode portion 642 is determined according to the teachings previously described with reference to EQUATIONS 5, with $r_3$ approximately corresponding to the radial dimension of the inner border 664' of the receiver electrode 664 and $r_4$ approximately corresponding to the radial dimension of the outer border 664". Because there is only one period of the shield electrode boundary 643 around $2\pi$ radians (N=1), the resulting quasi-sinusoidal boundary 643 appears approximately as an eccentric circle. In various exemplary embodiments, better tolerance for various misalignments is provided if the maximum radial extent of the border 643 is slightly less than the radial dimension of the outer border 664".

The inner electrode portion 644 is circular about the center of rotation and nominally coincides with the receiver electrode 644, as shown in FIG. 16. The inner electrode portion 644 includes open window areas 644A and 644B, that similarly nominally coincide with the receiver electrode 644, but may be slightly wider (or narrower) along the radial direction so as to minimize signal variations due to minor radial misalignments.

FIG. 17 shows the transmitter electrode configuration 620 in greater detail. The transmitter electrode configuration 620 includes transmitter electrodes 626–629. Each transmitter electrode 626–629 includes outer portions 626'–629' that are conveniently described as coinciding with quadrants of a circular capacitive coupling track that corresponds to the receiver electrode 664. In addition, each transmitter electrode 626–629 includes inner portions 626"–629" that have the same total area as the outer portions 626'–629' and are interlaced approximately as shown in FIG. 17, to lie with a shared circular capacitive coupling track that is slightly narrower than, and nominally centered within, the radial boundaries of the receiver electrode 665. The inner portions 626"–629" are separated from each other by a small insulating gap at the electrode borders shown in FIG. 17. In various exemplary embodiments, the boundaries of each of the respective inner portions 626"–629" are determined by analysis or trial and error design such that the incremental area dA' as a function of angle along an inner portion is a sinusoidal function over a range of 180 degrees around the center of rotation, approximately as shown in FIG. 17. The respective inner portions 626"–629" are thus identical, except that the maximum value of dA' for each respective inner portion occurs at an angular coordinate that corresponds to the angular midpoint of the corresponding electrically-connected outer portion.

According to the foregoing description, as one of the open window areas 644A or 644B that are aligned with the inner portions 626"–629" rotate along the direction of the measuring axis/direction 80', the area of each of the inner portions 626"–629" that overlaps the open window area 644A or 644B will vary approximately sinusoidally due to the as a function of the angular location of the open window area 644A or 644B along the direction of the measuring axis/direction 80'. In addition, as the outer boundary 643 of the outer electrode portion 642 that is aligned with the transmitter electrode outer portions 626'–629' rotates along the direction of the measuring axis/direction 80', the area of each of the outer portions 626'–629' that overlaps the shield electrode portion 642 will vary approximately sinusoidally due to the "eccentric" path of the outer boundary 643 that has one period around one rotation of the shield electrode member 659.

In operation, sinusoidal AC voltage signals having 0, 90, 180, and 270 degrees of temporal phase shift are applied to the transmitter electrodes 626–629, respectively, through the schematically-shown connections 626C–629C, respectively. Accordingly, it should be appreciated that with such signals applied to the transmitter electrodes 626–629, the transmitter electrodes 626–629 define an angular wavelength Q corresponding to one rotation about the transmitter electrode configuration 620, that is, Q=2π radians.

FIG. 18 shows the alignment of the transmitter electrode configuration 620 and the shield electrode configuration 640, and the areas where the transmitter electrode configuration 620 is shielded, and not shielded, by shield electrode configuration 640. Similarly to the single-period central portions of the previously described signal-balanced electrode configuration 500, the signal-balanced electrode configuration 600 provides an angular position signal having a temporal phase shift that varies nearly linearly as the shield electrode member 659 is rotationally displaced relative to the transmitter and receiver electrode members 639 and 679 along the measuring axis/direction 80'. As shown at the exemplary relative position shown in FIG. 18, when the outer electrode portion 626' is essentially unshielded (the dark solid area in FIG. 13) by the shield electrode, the outer electrode portions 627' and 629' are approximately one half shielded (the crosshatched area in FIG. 13), and the outer electrode portion 628' is essentially fully shielded. Therefore, the opposite phase signals from the transmitter electrode outer portions 627' and 629' will approximately balance and the signal from the unshielded transmitter electrode outer portion 626' will predominate on the receiver electrode 664, to produce a signal having a relative phase shift of approximately 0 degrees on the receiver electrode 664.

In an analogous manner, the inner electrode portion 626" is essentially fully shielded by the shield electrode, the inner electrode portions 627" and 629" are approximately one half unshielded (the crosshatched area in FIG. 13), and the inner electrode portion 628" is fully unshielded (the horizontally crosshatched area in FIG. 13). Therefore, the opposite phase signals from the transmitter electrode outer portions 627" and 629" will approximately balance and the signal from the unshielded transmitter electrode inner portion 628" will predominate on the receiver electrode 665, to produce a signal having a relative phase shift of approximately 180 degrees on the receiver electrode 665.

It should be appreciated that according to the embodiment described above, the signals output on the receiver electrode connections 662C and 663C may be input to a differential signal processing circuit, to provide a position or displacement measurement as previously described herein. In addition, the signals output on the receiver electrode connections 662C and 663C will be of equal magnitude and oppositite phase, which is advantageous for simplifying signal processing and removing certain common mode errors, in the same manner as previously described for the signals output on the receiver electrode connections 462C and 463C of the signal-balanced electrode configuration 400.

It should also be appreciated according to the foregoing description that the shield electrode configuration 640 couples equally to each of the transmitter electrodes 626–629, regardless of its relative rotational position, in order to provide a signal-balanced shield electrode configuration 640 according to this invention. Thus, for such a configuration of transmitter electrodes and signals, the shield electrode of the signal-balanced shield electrode configuration 640 will be maintained at a DC voltage determined by the transmitter signals, which may be zero volts in various exemplary embodiments, at least at each time that the transducer provides a displacement measurement signal, and the shield electrode itself will not contribute to any erroneous voltage-related signal variations on the receiver electrodes. Accordingly, it will act as desired, that is, simply as a displacement-dependent screening or blocking element between the transmitter and receiver electrodes.

The exemplary embodiment of the signal-balanced electrode configuration 600 shown in FIGS. 14–18 is thus reliably operable according to the principles of this invention. The signal-balanced electrode configuration 600 may be conveniently and reliably operated with an electrically floating shield electrode, if desired. The specific embodiment of the signal-balanced electrode configuration 600 described above and shown in FIGS. 14–18 provides an angular position signal having a temporal phase shift that varies approximately linearly as the shield electrode member 659 is rotationally displaced relative to the transmitter and receiver electrode members 639 and 679 along the measuring axis/direction 80'. However, it should be appreciated that other electrode configuration variations that provide non-linear position signals are also operable in various embodiments according to this invention, although such embodiments may provide less resolution and accuracy, they may have cost advantages or other benefits in various specific applications.

It should be appreciated that the angular position signal resulting from the operation of the capacitive coupling tracks corresponding to the receiver electrodes 664 and 665 provides a unique signal value at each angular position around one full rotation of the shield electrode member 659 relative to the transmitter and receiver electrode members 639 and 679. The signal-balanced electrode configuration 600 thus provides an "absolute" angular measurement capability around a full rotation of the transducer.

Figure 19:
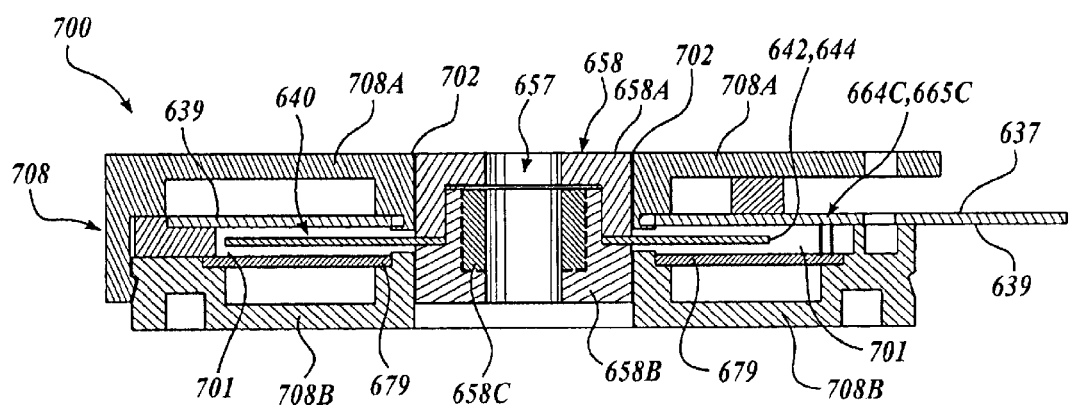
FIG. 19 is a side cross-sectional view through an exemplary rotary capacitive encoder assembly according to this invention, including the elements shown in FIGS. 14–18 for the sixth exemplary embodiment of a signal-balanced electrode configuration according to this invention.

FIG. 19 is a side cross-sectional view through an exemplary rotary capacitive encoder assembly 700 according to this invention, including the elements shown in FIGS. 14–18 for the sixth exemplary embodiment of a signal-balanced electrode configuration 600 according to this invention. As shown in FIG. 19, the rotary capacitive encoder assembly 700 includes a housing 708 including an upper portion 708A and a lower portion 708B. The transmitter electrode member 639 is attached to the upper portion 708A and the receiver electrode member 679 is attached to the lower portion 708B. The upper and lower portions 708A and 708B are configured such that they provide a through hole, indicated by the through hole walls 702, that provides an operating clearance for a non-conductive mounting hub 658. Furthermore the upper and lower portions 708A and 708B are configured such that they provide an space 701.

The shield electrode configuration 640 including the outer and inner portions 642 and 644, is located in the space 701. In the exemplary embodiment shown in FIG. 19, the conductive electrode portion of the shield electrode configuration 640 is sandwiched between the an upper portion 658A and a lower portion 658B of the non-conductive mounting hub 658. It should be appreciated that relative to a conductive mounting hub, the non-conductive mounting hub 658 tends to isolate or remove the conductive electrode portion of the shield electrode configuration 640 from any noise signals that might be present on a motor shaft or the like that is inserted through the mounting hub 658 to support and rotate the shield electrode configuration 640 in the space 701. The crosshatched region 658C indicates material that may optionally be omitted from the mounting hub 658 to provide an air gap that tends to further isolate or reduces the noise signals that might otherwise be coupled to the shield electrode configuration. Thus, the electrically floating signal-balanced shield electrode configuration 640 shown in the rotary capacitive encoder assembly 700 will tend to isolate the various previously outlined transmitter and receiver circuits from such noise signals that might be present on a motor shaft or the like that is inserted through the mounting hub 658.

Figure 20:
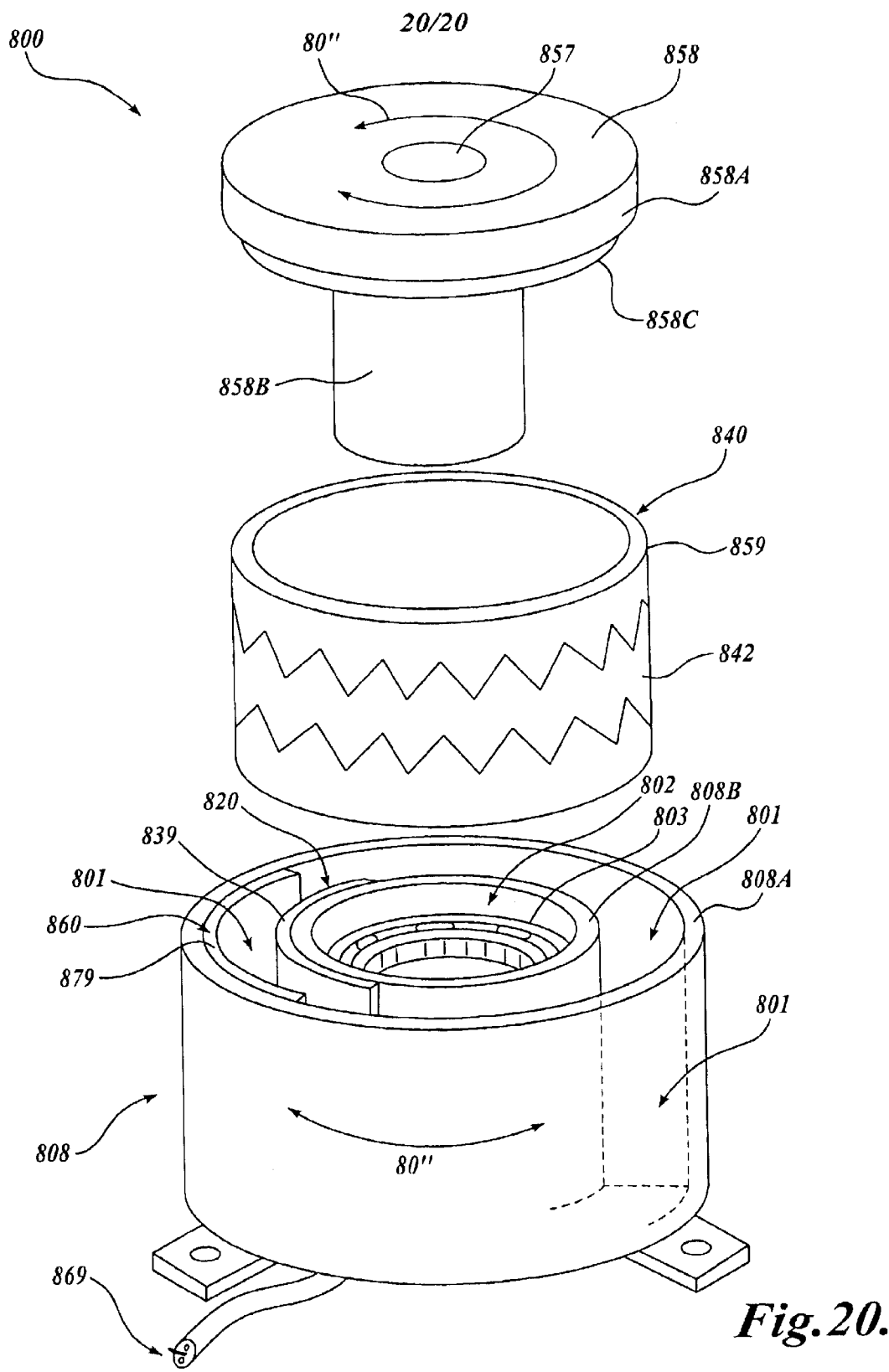
FIG. 20 is an exploded view of one exemplary cylindrical rotary capacitive encoder assembly according to this invention.

FIG. 20 is an exploded view of one exemplary cylindrical rotary capacitive encoder assembly 800 according to this invention, including the elements of a generic cylindrical signal-balanced electrode configuration according to this invention. The elements of the generic cylindrical signal-balanced electrode configuration are substantially similar to similarly number elements of any of the previously described linear signal-balanced electrode configurations. For example, the set of generic elements 820, 840 and 860 may be curved forms of any of the sets of elements 120, 140, and 160, or 220, 240, and 260, or 320, 340, and 360, and so on. In general, the curved shield electrode configuration 840 will include an integer number of periods of the included shield electrode(s) 842, or the like, around part or all of its circumference. The curved forms may be provided by fabricating the required electrode configurations, connections, and the like, on flexible printed circuit material, and curving the flexible printed circuits as desired.

As shown in FIG. 20, the cylindrical rotary capacitive encoder assembly 800 includes a housing 808 including an outer wall portion 808A and an inner wall portion 808B. The transmitter electrode member 839 is attached to the inner wall portion 808B and the receiver electrode member 879 is attached to the outer wall portion 808A, in operational alignment, with their measuring axis directions aligned with measuring axis/direction 80". Electrical connections to the various transmitter electrodes and receiver electrodes are provided through a multi-conductor wire 869 that passes through the housing 808. The outer wall portion 808A and inner wall portion 808B are configured such that they provide a cylindrical space 801. The inner wall portion 808B includes a hole 802, that provides an operating clearance for a lower hub portion 858B of a non-conductive mounting hub 858. One or more roller bearing assemblies 803 are provided along the hole 802, for receiving the lower hub portion 858B and operationally aligning the mounting hub 858 and the shield electrode member 859. The cylindrical shield electrode member 859, carrying the shield electrode 842 or the like is operationally aligned between the transmitter electrode member 839 and the receiver electrode member 879 in the cylindrical space 801.

In the exemplary embodiment shown in FIG. 20, the cylindrical shield electrode member 859 fits snugly over and is rigidly attached to the shoulder portion 858C of the mounting hub 858. It should be appreciated that relative to a conductive mounting hub, the non-conductive mounting hub 858 tends to isolate or remove the conductive electrode portion of the shield electrode configuration 840, as well as the transmitter and receiver electrode configurations 820 and 860 from any noise signals that might be present on a motor shaft or the like that is inserted through the mounting hub 858 to rotate the shield electrode configuration 840 in the space 801.

While the various exemplary embodiments of the invention have been illustrated and described, it will be appreciated that the foregoing embodiments are illustrative only, and not limiting. Thus, various changes can be made therein without departing from the spirit and scope of the invention.

What is claimed is:

1. A capacitive-type displacement sensing device for determining a relative position between two members along a measuring axis direction, the displacement sensing device comprising:

a transmitter member, the transmitter member comprising a first transmitter element configuration comprising at least two transmitter electrode elements;

a receiver member comprising a first receiver element configuration comprising at least one receiver electrode element, the first receiver element configuration fixed relative to the first transmitter element configuration and capacitively coupled to the first transmitter element configuration across an operating gap located between the first receiver element configuration and the first transmitter element configuration; and a scale member, the scale member comprising at least a first shield element configuration comprising at least one shield electrode element, the first shield element configuration located in the operating gap located between the first receiver element configuration and the first transmitter element configuration, the first shield element configuration movable along the measuring axis direction relative to the first transmitter element configuration and the first receiver element configuration to modulate the capacitive coupling between the first transmitter element configuration and the first receiver element configuration, and the first shield element configuration capacitively coupled to the first transmitter element configuration to provide a first shield-transmitter capacitive coupling configuration, wherein:

the at least two transmitter electrode elements of the first transmitter element configuration are respectively operable to provide respective time-varying transmitter voltage signals during a measurement period;

for any relative position within a range of relative positions between the transmitter member and the scale member along the measuring axis direction, the respective time-varying transmitter voltage signals are operable in combination with the first shield-transmitter capacitive coupling configuration such that if the capacitive-type displacement sensing device were operated with the first shield element configuration electrically floating a resulting net voltage change of the at least one shield electrode element of the first shield element configuration due solely to the respective time-varying voltage signals in combination with the first shield-transmitter capacitive coupling configuration would be inherently approximately zero for at least one time during the measurement period; and the at least one receiver electrode element of the first receiver element configuration is respectively operable to provide at least one respective receiver signal at least during the at least one time during the measurement period, and the at least one respective receiver signal is usable to determine the relative position between the transmitter member and the scale member along the measuring axis direction.

2. The capacitive-type displacement sensing device of claim 1, wherein the capacitive-type displacement sensing device is operable with the first shield electrode element electrically floating.

3. The capacitive-type displacement sensing device of claim 1, wherein the capacitive-type displacement sensing device is operable with the first shield electrode configuration coupled to at least one element that redundantly contributes to the net voltage change of the at least one shield electrode element being approximately zero for a least one time during the measurement period.

4. The capacitive-type displacement sensing device of claim 3, wherein the first shield electrode configuration is coupled by at least one of a) capacitive coupling and b) a conductive path.

5. The capacitive-type displacement sensing device of claim 1, wherein the respective time-varying transmitter voltage signals comprise at least one pair of transmitter signals having approximately equal amplitudes and opposite polarities and the at least one respective receiver signal comprises a signal that varies in amplitude and polarity relative to one of the pair of signals, in a manner that is a function of the relative position between the transmitter member and the scale member along the measuring axis direction.

6. The capacitive-type displacement sensing device of claim 5, wherein the first shield element configuration comprises a pattern that is periodic along the measuring axis direction and the at least one respective receiver signal comprises a signal that varies in amplitude and polarity relative to one of the pair of transmitter signals, in a manner that is a periodic function of the relative position between the transmitter member and the scale member along the measuring axis direction.

7. The capacitive-type displacement sensing device of claim 6, wherein the at least one receiver electrode element comprises two receiver electrode elements that provide respective receiver signals that vary in amplitude and polarity relative to one of the pair of transmitter signals, in a manner that is a periodic function of the relative position between the transmitter member and the scale member along the measuring axis direction, and the two receiver electrode elements are arranged such that their periodic functions are in quadrature.

8. The capacitive-type displacement sensing device of claim 1, wherein:
the first shield element configuration comprises a pattern that is periodic along the measuring axis direction according to a pitch P;
a first transmitter element configuration comprises at least one group of N transmitter electrode elements uniformly distributed along a direction parallel to the measuring axis direction according to a group pitch dimension approximately equal to P, where N is an integer that is at least three;
the N transmitter electrode elements of each at least one group are respectively operable to provide N respective sinusoidal transmitter voltage signals having approximately equal amplitudes and providing N respective temporal phases evenly distributed over 360 degrees of temporal phase shift; and
the at least one respective receiver signal comprises a sinusoidal signal that varies in temporal phase relative to one of the sinusoidal transmitter voltage signals, in a manner that is an approximately linear function of the relative position between the transmitter member and the scale member along the measuring axis direction.

9. The capacitive-type displacement sensing device of claim 8, wherein the at least one group of N transmitter electrode elements and the periodic pattern of the first shield element configuration are configured such that, when the first shield element configuration is moved along the measuring axis direction relative to the first transmitter element configuration and the first receiver element configuration, the first shield element configuration modulates the capacitive coupling between the first transmitter element configuration and the first receiver element configuration in a manner that is an approximately sinusoidal function of the relative position between the transmitter member and the scale member along the measuring axis direction.

10. The capacitive-type displacement sensing device of claim 9, wherein:

the at least one receiver electrode element comprises two receiver electrode elements that provide two respective sinusoidal receiver signals that vary in temporal phase relative to one of the sinusoidal transmitter voltage signals, in a manner that is an approximately linear function of the relative position between the transmitter member and the scale member along the measuring axis direction;
the two receiver electrode elements are arranged such that the two respective sinusoidal receiver signals have approximately equal amplitudes and temporal phases that differ by 180 degrees at any relative position; and
the capacitive-type displacement sensing device is operable to input two respective sinusoidal receiver signals into a differential signal processing circuit to provide a differential signal having a temporal phase that is indicative of the relative position between the transmitter member and the scale member along the measuring axis direction.

11. The capacitive-type displacement sensing device of claim 10, wherein the capacitive-type displacement sensing device comprises one of a) a linear displacement sensing arrangement having a linear measuring axis and b) a cylindrical displacement sensing arrangement having a measuring axis comprising at least a portion of a circle and at least one of the first transmitter element configuration, the first receiver element configuration and the first shield element configuration exhibits a mirror symmetry with respect to a centerline of the configuration that extends along a direction parallel to the measuring axis direction.

12. The capacitive-type displacement sensing device of claim 10, wherein:
the capacitive-type displacement sensing device comprises a rotary displacement sensing arrangement having a circular measuring axis and relative planar transmitter, receiver and scale members;
the pitch P comprises an angular pitch along the measuring axis direction;
the scale member includes a conductive element that provides the at least one shield electrode element;
the first shield element configuration comprises a pattern that is periodic along the circular measuring axis direction according to the angular pitch P and that is formed by at least one of a) at least one formed boundary of the conductive element and b) a set of openings formed in the conductive element; and
the two receiver electrode elements comprise two concentric circular electrodes configured such that the areas of the two concentric circular electrodes are approximately equal.

13. The capacitive-type displacement sensing device of claim 12, wherein the scale member comprises a printed circuit board substrate and the conductive element comprises a conductive electrode pattern formed on the printed circuit board substrate.

14. The capacitive-type displacement sensing device of claim 12, wherein:
the scale member comprises a self-supporting planar metal element that provides the conductive element; and
the first shield element configuration comprises a pattern that is formed by at least one of a) at least one formed boundary of the planar metal element and b) a set of openings formed in the planar metal element.

15. The capacitive-type displacement sensing device of claim 12 further comprising an insulating mounting hub that couples the scale element to an external shaft that drives the mounting hub and scale member in a manner that spaces the conductive element apart from the external shaft.

16. The capacitive-type displacement sensing device of claim 15 wherein the insulating mounting hub is configured in a manner that interposes an air gap between the conductive element and the external shaft.

17. The capacitive-type displacement sensing device of claim 8, wherein:

the sinusoidal signal that varies in temporal phase relative to one of the sinusoidal transmitter voltage signals, provides a first measurement signal that undergoes a temporal phase shift of 360 degrees relative to the one of the sinusoidal transmitter voltage signals as the relative position between the transmitter member and the scale member changes by one increment of the pitch P the along the measuring axis direction;

the transmitter member further comprises a second transmitter element configuration comprising at least one group of M transmitter electrode elements uniformly distributed along a direction parallel to the measuring axis direction according to a second group pitch dimension approximately equal to a pitch Q, where M is an integer that is at least two;

the M transmitter electrode elements of each at least one group are respectively operable to provide M respective sinusoidal transmitter voltage signals having approximately equal amplitudes and providing M respective temporal phases evenly distributed over 360 degrees of temporal phase shift;

the receiver member further comprises a second receiver element configuration comprising at least one receiver electrode element, the second receiver element configuration fixed relative to the second transmitter element configuration and capacitively coupled to the second transmitter element configuration across an operating gap located between the second receiver element configuration and the second transmitter element configuration;

the scale member further comprises at least a second shield element configuration comprising at least one shield electrode element;

the second shield element configuration comprises a pattern that is periodic along the measuring axis direction according to the pitch Q and the pitch Q is larger than the pitch P;

the second shield element configuration is located in the operating gap located between the second receiver element configuration and the second transmitter element configuration, the second shield element configuration movable along the measuring axis direction relative to the second transmitter element configuration and the second receiver element configuration to modulate the capacitive coupling between the second transmitter element configuration and the second receiver element configuration, and the second shield element configuration capacitively coupled to the second transmitter element configuration to provide a second shield-transmitter capacitive coupling configuration, wherein:

the at least two transmitter electrode elements of the second transmitter element configuration are respectively operable to provide respective time-varying transmitter voltage signals during a measurement period;

for any relative position within a range of relative positions between the transmitter member and the scale member along the measuring axis direction, the respective time-varying transmitter voltage signals are operable in combination with the second shield-transmitter capacitive coupling configuration such that if the capacitive-type displacement sensing device were operated with the second shield element configuration electrically floating a resulting net voltage change of the at least one shield electrode element of the second shield element configuration due solely to the respective time-varying voltage signals in combination with the second shield-transmitter capacitive coupling configuration would be inherently approximately zero for at least one time during the measurement period;

the at least one receiver electrode element of the second receiver element configuration is respectively operable to provide at least one respective receiver signal at least during the at least one time during the measurement period, and the at least one respective receiver signal comprises a sinusoidal signal that varies in temporal phase relative to one of the sinusoidal transmitter voltage signals to provide a second measurement signal that undergoes a temporal phase shift of 360 degrees relative to the one of the sinusoidal transmitter voltage signals as the relative position between the transmitter member and the scale member changes by one increment of the pitch Q the along the measuring axis direction, and the first measurement signal is usable in combination with the second measurement signal to provide an absolute position measurement capability over a range approximately equal to the pitch Q, the absolute position measurement having a resolution that depends on the measurement resolution of the temporal phase shift of the first measurement signal over one increment of the pitch P.

18. The capacitive-type displacement sensing device of claim 17, wherein:

the capacitive-type displacement sensing device comprises a rotary displacement sensing arrangement having a circular measuring axis;

the pitches P and Q comprises angular pitches along the measuring axis direction; and the pitch Q is equal to 360 degrees.

19. The capacitive-type displacement sensing device of claim 1, wherein:

the first shield element configuration comprises a pattern that is periodic along the measuring axis direction according to a pitch P; and the at least one receiver electrode element has a dimension along the measuring axis direction that is approximately equal to K*P, where K is an integer.

* * * * *

UNITED STATES PATENT AND TRADEMARK OFFICE
CERTIFICATE OF CORRECTION

PATENT NO.     : 6,892,590 B1
DATED          : May 17, 2005
INVENTOR(S)    : N.I. Andermo It is certified that error appears in the above-identified patent and that said Letters Patent is hereby corrected as shown below:

Title page,
Item [54], Title, "SINGLE-BALANCED SHIELD ELECTRODE CONFIGURATION FOR USE IN CAPACITIVE DISPLACEMENT SENSING SYSTEMS AND METHODS" should read -- SIGNAL-BALANCED SHIELD ELECTRODE CONFIGURATION FOR USE IN CAPACITIVE DISPLACEMENT SENSING SYSTEMS AND METHODS --.

Signed and Sealed this

Twenty-seventh Day of September, 2005

JON W. DUDAS
*Director of the United States Patent and Trademark Office*

UNITED STATES PATENT AND TRADEMARK OFFICE
CERTIFICATE OF CORRECTION

PATENT NO. : 6,892,590 B1
APPLICATION NO. : 10/701772
DATED : May 17, 2005
INVENTOR(S) : N. I. Andermo It is certified that error appears in the above-identified patent and that said Letters Patent is hereby corrected as shown below:

| COLUMN | LINE | ERROR |
|---|---|---|
| 11 | 17 | "175B" should read --175A-- |
| 11 | 23 | "175BA" should read --175B-- |
| 21 | 29 | "240" should read --340-- |
| 21 | 52 | "359," should read --339,-- |
| 22 | 64 | "42 and 42'" should read --342 and 342'-- |
| 26 | 22 | "an printed" should read --a printed-- |
| 26 | 28 | "422A-225A," should read --422A-425A,-- |
| 26 | 30 | "422B-225B," should read --422B-425B,-- |
| 37 | 17 | "13)" should read --18)-- |
| 37 | 19 | "13)," should read --18),-- |
| 37 | 31 | "13)," should read --18),-- |
| 37 | 33 | "13)." should read --18).-- |
| 40 (Claim 2, | 55 line 3) | "the first shield electrode element" should read --the first shield element configuration-- |
| 40 (Claim 3, | 59-60 lines 3-4) | "the first shield electrode configuration" should read --the first shield element configuration-- |

UNITED STATES PATENT AND TRADEMARK OFFICE
CERTIFICATE OF CORRECTION

PATENT NO. : 6,892,590 B1
APPLICATION NO. : 10/701772
DATED : May 17, 2005
INVENTOR(S) : N. I. Andermo It is certified that error appears in the above-identified patent and that said Letters Patent is hereby corrected as shown below:

| COLUMN | LINE | ERROR |
|---|---|---|
| 40 (Claim 4, | 65 line 2) | "the first shield electrode configuration" should read --the first shield element configuration-- |

Signed and Sealed this

Twenty-fourth Day of June, 2008

JON W. DUDAS
*Director of the United States Patent and Trademark Office*